US008407164B2

(12) United States Patent
Malik et al.

(10) Patent No.: US 8,407,164 B2
(45) Date of Patent: Mar. 26, 2013

(54) DATA CLASSIFICATION AND HIERARCHICAL CLUSTERING

(75) Inventors: Hassan Haider Malik, Monmouth Junction, NJ (US); John Ronald Kender, Leonia, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 448 days.

(21) Appl. No.: 12/602,908

(22) PCT Filed: Jun. 11, 2008

(86) PCT No.: PCT/US2008/007308
§ 371 (c)(1),
(2), (4) Date: Mar. 18, 2010

(87) PCT Pub. No.: WO2008/154029
PCT Pub. Date: Dec. 18, 2008

(65) Prior Publication Data
US 2010/0174670 A1    Jul. 8, 2010

Related U.S. Application Data

(60) Provisional application No. 60/943,218, filed on Jun. 11, 2007, provisional application No. 60/950,134, filed on Jul. 17, 2007, provisional application No. 60/963,600, filed on Aug. 6, 2007, provisional application No. 60/827,803, filed on Oct. 2, 2006.

(51) Int. Cl.
*G06F 15/18* (2006.01)
(52) U.S. Cl. ........................................ 706/12
(58) Field of Classification Search ......................... None
See application file for complete search history.

(56) References Cited

U.S. PATENT DOCUMENTS

| 2004/0220782 | A1  | 11/2004 | Cook et al. | |
| 2005/0060643 | A1* | 3/2005  | Glass et al.    | 715/501.1 |
| 2006/0224532 | A1* | 10/2006 | Duan et al.     | 706/15 |
| 2007/0185656 | A1* | 8/2007  | Schadt          | 702/19 |
| 2007/0239694 | A1* | 10/2007 | Singh et al.    | 707/3 |
| 2009/0203588 | A1* | 8/2009  | Willman et al.  | 514/12 |
| 2009/0240639 | A1* | 9/2009  | George et al.   | 706/12 |

FOREIGN PATENT DOCUMENTS

WO    WO-2008/154029 A1    12/2008

OTHER PUBLICATIONS

Malik, "Efficient Algorithms for Clustering and Classifying High Dimensional Text and Discretized Data using Interesting Patterns", Columbia Univeristy, Phd Thesis, New York, 2008, pp. 158.*
Yount, Research Design & Statistical Analysis in Christian Ministry, North American Professors of Christian Education Association, Ft Worth, http://www.napce.org/documents/research-design-yount/17_normal_4th.pdf, 2006, pp. 17-1 to 17-14.*

(Continued)

*Primary Examiner* — Kakali Chaki
*Assistant Examiner* — Walter Hanchak
(74) *Attorney, Agent, or Firm* — Schwegman Lundberg Woessner P.A.

(57) ABSTRACT

Apparatus, systems, and methods can operate to provide efficient data clustering, data classification, and data compression. A method comprises training set of training instances can be processed to select a subset of size-1 patterns, initialize a weight of each size-1 pattern, include the size-1 patterns in classes in a model associated with the training set, and then include a set of top-k size-2 patterns in a way that provides an effective balance between local, class, and global significance patterns. A method comprises processing a dataset to compute an overall significance value of each size-2 pattern in each instance in the dataset, sort the size-2 patterns, and select the top-k size-2 patterns to be represented in clusters, which can be refined into a clustered hierarchy. A method comprises creating an uncompressed bitmap, reordering the bitmap, and compressing the bitmap. Additional apparatus, systems, and methods are disclosed.

30 Claims, 19 Drawing Sheets

OTHER PUBLICATIONS

Yen and Chen, "A Graph-Based Approach for Discovering Various Types of Association Rules", IEEE Transactions on Knowledge and Data Enginnering, vol. 13, No. 5, Sep. 2001, pp. 839-845.*

"International Application Serial No. PCT/US2007/07308, International Search Report and Written opinion mailed Sep. 10, 2008", p. 220.

* cited by examiner

```
01) build-model(training_set, k, measure)
02)   {select features as explained in section 3}
03)   model = Φ
04)   forall training instances t ∈ training_set do begin
05)       forall atomic patterns p ∈ t do begin
06)           weight(p) = support(p, training_set)
07)           append (p, each applicable class in model)
08)       end
09)       list = Φ
10)       forall size-2 patterns p ∈ t do begin
11)           significance_local = average(TF(p_1), TF(p_2))
12)           class_significance_list = Φ
13)           forall class c ∈ p do begin
14)               append(class_significance_list, interestingness(p, measure, training_set, c))
15)           end
16)           significance_class = average(class_significance_list)
17)           significance_global = interestingness(p, measure, training_set)
18)           significance(p) = significance_local * significance_class * significance_global
19)           append (list, p)
20)       end
21)       {sort list in decreasing order of significance(p)}
22)       for (i = 1; i <= k; i ++) do begin
23)           weight(list_i) = interestingness(list_i, measure, training_set)
24)           append (list_i, each applicable class in model)
25)       end
26)   end
27)   {apply z-score standardization on all weights in model}
28)   forall classes c ∈ model do begin
29)       forall patterns p ∈ c do begin
30)           weight(p) = weight(p) * mono(support(p, c)/size(c))
31)       end
32)   end
33)   return model
34) end
```

*FIG. 4*

```
1) result = Φ
2) I₁ = U₁ = {large 1-itemsets}
3) for (k = 2; I_{k-1} != 0; k ++) do begin
4)    I_k = find-interesting-itemsets(I_{k-1}, U_{k-1})
5)    append(result, I_k)
6)    U_k = get-unique-items(I_k)
7) end
8) answer = result
```

*(a) Technique CII-MINE*

```
1) find-interesting-itemsets(super_items, unique_items)
2) interesting_itemsets = Φ
3) for (i = 0; i < size(super_items); i ++) do begin
4)    for (j = index-of(get-last-item(super_items[i]), unique_items) + 1; j < size(unique_items); j ++) do begin
5)       candidate_itemset = super_items[i] U unique_items[j]
6)       subset_itemsets = find-subset-itemsets(candidate_itemset)
7)       if (contains(I_{k-1}, subset_itemsets)) then
8)          if (closed(candidate_itemset, subset_itemsets, I_{k-1})) then
9)             val = apply-measure(super_items[i], unique_items[j])
10)            if (val >= min_interestingness_threshold) then
11)               append(interesting_itemsets, candidate_itemset);
12)            end
13)         end
14)      end
15)   end
16) end
17) answer = interesting_itemsets
18) end
```

*(b) Technique find-interesting-itemsets*

FIG. 6

1) {allocate array global_map}
2) {allocate array lev_maps with size = k}
3) for (i = k; i >= 1; i--) do begin
4)     forall itemsets t ∈ $I_i$ do begin
5)         $bitmap_t$ = $bitmap_t$ AND (NOT global_map)
6)         lev_maps [i] = lev_maps [i] OR bitmap
7)     end
8)     global_map = global_map OR lev_maps [i]
9) end

*FIG. 7*

```
1)  for (i = k; i >= 1; i--) do begin
2)    forall itemsets t ∈ I_i do begin
3)      if (document-count(bitmap_t) > 0 .OR. contains(parents_{i+1}, t) then
4)        if (i = 1) then
5)          add(children_root, t);
6)        else
7)          S = get-k-subsets(t)
8)          sorted_list = Φ
9)          forall itemsets super_item ∈ S do begin
10)           if (contains(I_{i-1}, super_item)) then
11)                 interestingness_val = apply-measure(super_item, t - super_item)
12)             add(sorted_list, super_item, interestingness_val)
13)         end
14)       end
15)       for (j = 0; j < MAX_NODE_DUP .AND. size(sorted_list) >= j; j++) do begin
16)         itemset = get-itemset(I_{i-1}, sorted_list_j)
17)         add(children_itemset, t)
18)         if (.NOT. contains(parents_i, itemset)) then
19)           add(parents_i, itemset)
20)         end
21)       end
22)     end
23)   else
24)     prune(t)
25)   end
26)  end
27) end
```

*FIG. 8*

```
01) build-hierarchy(dataset, min_std_dev, maxK, measure)
02)     {reduce dimensionality}
03)     top_level_clusters = Φ
04)     instance_cluster_pointers = Φ
05)     forall transactions t ∈ dataset do begin
06)         list = Φ
07)         forall size-2 patterns p ∈ t do begin
08)             significance_local = average(freq($p_1$, t), freq($p_2$, t))
09)             significance_global = interestingness(p, measure, dataset)
10)             significance(p) = significance_local* significance_global
11)             append (list, p)
12)         end
13)         {sort list in decreasing order of significance values}
14)         {calculate mean and standard_deviation of significance values in list}
15)         add-to-cluster(top_level_clusters, list(1), t)
16)         append(instance_cluster_pointers(t), list(1))
17)         min_significance = mean + (standard_deviation * min_std_dev)
18)         for (i = 2; i <= maxK - 1; i ++) do begin
19)             if significance(list(i)) < min_significance then break
20)             add-to-cluster(top_level_clusters, list(i), t)
21)             append(instance_cluster_pointers(t), list(i))
22)         end
23)     end
24)     prune-duplicates(instance_cluster_pointers, top_level_clusters)
25)     clusters_to_refine = top_level_clusters
26)     while size(clusters_to_refine) > 0 do begin
27)         refined_clusters = refine-clusters(instance_cluster_ptrs, clusters_to_refine)
28)         {regenerate instance_cluster_pointers using refined_clusters}
29)         prune-duplicates(instance_cluster_pointers, refined_clusters)
30)         clusters_to_refine = refined_clusters
31)     end
32)     {apply bisecting k-means to merge top_level_clusters}
33) end
```

*FIG. 10*

01) add-to-cluster(*cluster_list, pattern, instance*)
02)   if *pattern* not in *cluster_list* then
03)     {add a new cluster with label = *pattern* to *cluster_list*}
04)   end
05)   {append *instance* to cluster with label = *pattern* in *cluster_list*}
06) end

01) prune-duplicates(*instance_cluster_ptrs, cluster_list*)
02)   forall ptr lists *l* ∈ *instance_cluster_ptrs* do begin
03)     *m* = {clusters in *l* that also exists in *cluster_list*}
04)     forall cluster pairs *p(cluster1, cluster2)* ∈ *m* do begin
05)       if *cluster1* and *cluster2* contain same instances then
06)         label(*cluster1*) = merge-labels(*cluster1, cluster2*)
07)         remove(*cluster_list, cluster2*)
08)       end
09)     end
10)   end
11) end

01) refine-clusters(*instance_cluster_ptrs, cluster_list*)
02)   *refined_clusters* = Φ
03)   forall ptr lists *l* ∈ *instance_cluster_pointers* do begin
04)     *m* = {clusters in *l* that also exists in *cluster_list*}
05)     {for each cluster *c* in *m* remove *c* from *m* if size(*c*) < 2}
06)     forall cluster pairs *p(cluster1, cluster2)* ∈ *m* do begin
07)       *cluster_label* = merge-labels(*cluster1, cluster2*)
08)       if *cluster_label* not in *refined_clusters* then
09)         {Add a new cluster to *refined_clusters* with label = *cluster_label*}
11)       end
12)       *common_instances* = *cluster1* ∩ *cluster2*
13)       {add instances in *common_instances* to cluster with label = *cluster_label* in *refined_clusters*}
15)       {mark instances in *common_instances* for elimination in both *cluster1* and *cluster2*}
17)       {Add cluster with label = *cluster_label* as a child node to both *cluster1* and *cluster2*}
19)     end
20)   end
21)   {In one pass over clusters in *cluster_list*, prune all instances that were marked for elimination}
23)   return *refined_clusters*
24) end

*FIG. 11*

1) break-ties(S, i, candidates)
2)     d = bitmap of $S_{i-1}$ XOR bitmap of $S_{i-2}$
3)     L = Φ
4)     for i = 1 to |candidates| do begin
5)         temp = bitmap of candidates[i] XOR bitmap of $S_{i-1}$
6)         L[i] = countOneBits(temp XOR d)
7)     end
8)     M = {minimum value in L}
9)     C = {index of first candidate with M in L}
10)     return candidates[C]
11) end

*FIG. 16*

```
1)  aHDO (S, k)
2)      {find a row M with minimum number of columns}
3)      {swap rows 1 and M}
4)      interval = ⌊|S| / k⌋
5)      for i = 0 to k - 1 do begin
6)          L = Φ
7)          for j = (i * interval) + 2 to |S| do begin
8)              L[j] = tDist(S_(i*interval)+1, S_j)
9)          end
10)         {Using values in L, apply counting sort to order transactions S_(i*interval)+2 to S_|S|}
11)     end
12)     L = Φ
13)     for i = 2 to |S| do begin
14)         L[i] = tDist(S_i, S_(i-1))
15)     end
16)     for i = 2 to k do begin
17)         numberOfSwaps = 0
18)         for j = 2 to |S| - 1
19)             dist_(j-1)And_(j+1) = tDist(S_(j-1), S_(j+1))
20)             dist_jAnd_(j+2) = tDist(S_j, S_(j+2))
21)             d1 = L[j] - dist_(j-1)And_(j+1)
22)             d2 = L[j+2] - dist_jAnd_(j+2)
23)             if (d1 > 0 OR d2 > 0) AND (d1>=0 AND d2>=0) then
24)                 numberOfSwaps++
25)                 {swap rows at j, j+1}
26)                 L[j] = dist_(j-1)And_(j+1)
27)                 L[j+1] = dist_jAnd_(j+2)
28)             end
29)         end
30)         if numberOfSwaps = 0 then break
31)     end
32) end
```

DATA CLASSIFICATION AND HIERARCHICAL CLUSTERING

RELATED PATENT DOCUMENTS

This application is a nationalization under 35 U.S.C. 371 of PCT/US2008/007308, filed Jun. 11, 2008 and published as WO 2008/154029, on Dec. 18, 2009; which patent application claims the benefit of priority under 35 U.S.C. §119(e) to U.S. Provisional Patent Application Ser. No. 60/943,218 filed on Jun. 11, 2007 and entitled "Classifying High-Dimensional Categorical Data Using Very Short Patterns"; U.S. Provisional Patent Application Ser. No. 60/950,134 filed on Jul. 17, 2007 and entitled "Improving or Optimizing Frequency Queries, such as for Data Mining Applications"; and U.S. Provisional Patent Application Ser. No. 60/963,600 filed on Aug. 6, 2007 and entitled "An Instance Driven Approach to Pattern-Based Hierarchical Clustering", the contents of which are incorporated herein by reference in their entirety. This patent application is also related to U.S. Provisional Patent Application Ser. No. 60/827,803 filed on Oct. 2, 2006 and entitled "High Quality, Efficient Hierarchical Document Clustering Using Closed Interesting Itemsets," the contents of which applications and publication are incorporated herein by reference in their entirety and made a part hereof.

BACKGROUND

Data mining is the process of organizing, searching, and sorting large amounts of data to identify, classify, and store relevant information. The process of data mining is expansive and complex. Some of the data manipulation that occurs during data mining includes classification, clustering, both hierarchical and flat, and frequency queries.

SUMMARY

This application describes a pattern-based classification process that can use only very short patterns for classification, and does not require a minimum support threshold. The training phase allows each training instance to "vote" for top-k, size-2 patterns, such as in a way that provides an effective balance between local, class, and global significance of patterns. Unlike certain approaches, the process need not make Boolean decisions on patterns that are shared across classes. Instead, these patterns can be concurrently added to all applicable classes and a power law based weighing scheme can be applied to adjust their weights with respect to each class.

This application also describes an approach that can use frequent itemsets and closed frequent itemsets such as to reduce dimensionality or to help the efficiency of hierarchical document clustering. In particular, a technique that can be used to reduce high-dimensionality includes "closed interesting" itemsets (e.g., closed itemsets with high interestingness). A related heuristic, such as a "super item," can be used to efficiently mine these types of itemsets and show that they can provide dimensionality reduction compared to closed frequent itemsets.

This application also describes a pattern-based hierarchical clustering technique that can build a cluster hierarchy without requiring mining for globally significant patterns. The technique allows each instance to "vote" for its representative size-2 patterns, such as in a way that helps ensure an effective balance between local and global pattern significance. The number of patterns selected for each instance can be dynamically determined using a local standard deviation based scheme, and the rest of the cluster hierarchy can be obtained by following a certain iterative cluster refinement process. By effectively using instance-to-cluster relationships, this technique can directly identify clusters for each level in the hierarchy, and can efficiently prune duplicate clusters. Furthermore, this technique can produce more descriptive cluster labels, and can adapt a soft clustering scheme that allows instances to exist in suitable nodes at various levels in the cluster hierarchy.

This application also describes HDO, a novel Hamming-distance-based greedy transaction reordering scheme, and aHDO, a linear-time approximation to HDO. HDO-reordered, WAH encoded bit vectors can take as little as 5% of the uncompressed space, while aHDO can achieve similar compression on sparse datasets. Furthermore, it can be shown that the present bitmap-based approaches can result in up to hundreds of times faster support counting and that HDO-WAH encoded bitmaps can offer the best space-time tradeoff.

BRIEF DESCRIPTION OF DRAWINGS

Some embodiments are illustrated by way of example and not limitation in the figures of the accompanying drawings in which:

FIG. 4 is a pseudo-code listing illustrating an example of a function to build a model given a training set, a user-defined value k, and an interestingness measure value;

FIG. 6 is a pseudo-code listing illustrating an example of a function, to mine "closed interesting" itemsets;

FIG. 7 is a pseudo-code listing illustrating an example of a function to prune documents in a single pass on discovered "closed interesting" itemsets, without requiring processing individual documents;

FIG. 8 is a pseudo-code listing illustrating an example of a function to construct a hierarchy from the bottom up;

FIG. 10 is a pseudo-code listing illustrating an example of a function to construct a hierarchy using clusters;

FIG. 11 is a pseudo-code listing illustrating an example of functions to add a pattern to a cluster, prune duplicate clusters, and refine clusters;

FIG. 16 is a pseudo-code listing illustrating an example of a function to break ties among several least-distant transactions;

FIG. 17 is a pseudo-code listing illustrating an example of aHDO;

DETAILED DESCRIPTION

Overview of Data Classification Techniques

Figure 1:
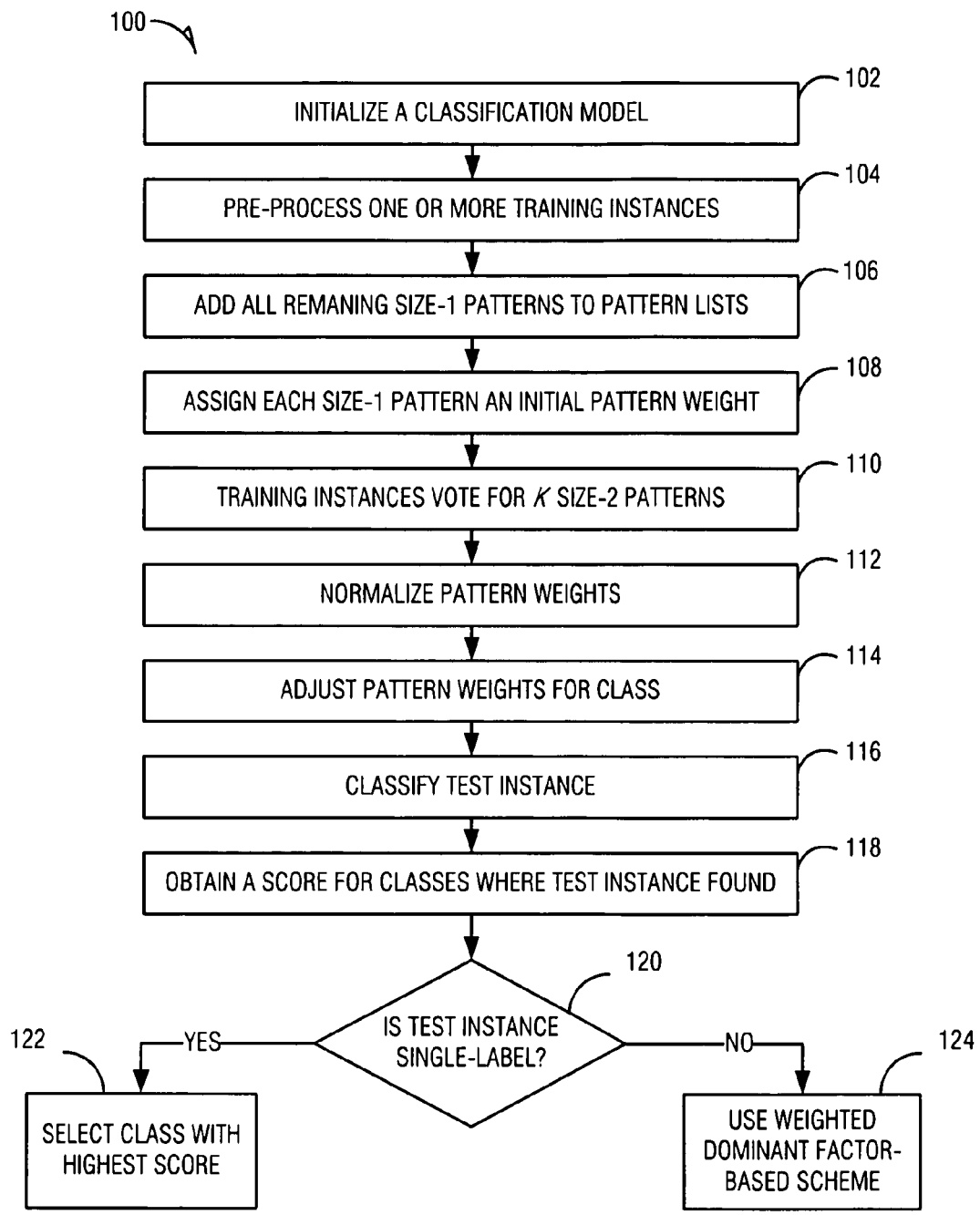
FIG. 1 is an example of building and using a classification model.

In general, data classification can employ a learning routine that uses a training set of data to develop pattern rules. The pattern rules can be used to analyze data and classify the data into one or more classes. The classes can then be used in various post-processes, such as sorting, counting, or displaying.

Data classification can involve machine learning processes such as SVM, C4.5, and kNN. The classification model in a data mining based classification process can include frequent patterns that form classification rules. These patterns can be obtained by applying various pruning heuristics to reduce a large search space. One example uses a minimum support threshold as the heuristic and can be used as one mechanism to filter a significant percentage of candidate patterns. A further example can use a second measure, such as confidence, information gain, or chi-square, for additional filtration of the candidate patterns. Setting a good value for the minimum support threshold can be non-trivial. A high minimum support can exclude important patterns and can also risk having some training instances be unrepresented altogether. This can occur especially on unbalanced datasets. On the other hand, a small value for the minimum support threshold can result in discovering a larger number of noisy patterns. Considering these issues, the usefulness of a minimum support threshold can be questionable.

In addition to potential issues using a minimum support threshold, there is also an issue in which on high-dimensional datasets, the number of candidates considered, as well as the number of frequent patterns found, can significantly increase with the pattern size, especially when a low minimum support threshold is used. Consequently, mining long patterns can take significantly more computational time when compared to mining short patterns.

A number of approaches to rule-based classification processes can follow a greedy rule-induction process to discover classification rules. In these processes, rules are discovered one at a time, and instances covered by the newly discovered rule are eliminated from the training set, which can degrade the quality of discovered rules as the training process advances because of incomplete information. Furthermore, this process might need to be repeated for each class, impacting the runtime of these processes.

Association-rule-based classification processes first mine globally significant patterns and then follow a sequential covering paradigm to select the final set of rules. Because of their inherent dependencies on minimum support and confidence thresholds, these processes can find too many or too few rules, and still may not cover some of the training instances. One proposed specialized approach is designed to provide a more effective, instance-centric approach to mine classification rules, and builds the classification model by directly mining some user-defined number of highest-confidence rules for each training instance that satisfy minimum support. Furthermore, in this approach, rules for all classes are mined simultaneously, and one of the user-configurable, local item ranking schemes (e.g., correlation coefficient ascending order) takes both the class and global item supports in to account. Experimental results show that this approach, when further tuned with a suitable minimum support value for each dataset, outperformed existing rule based classification processes, and achieved classification accuracies that are comparable to SVM.

A labeled collection of training instances can provide three important pieces of information about each pattern in a categorical dataset: first, the global frequency of the pattern; second, the frequency of the pattern in each applicable class; and third, the frequencies of atomic sub-patterns in individual training instances that contain the whole pattern. These three pieces of information can be used to evaluate the pattern significance at various levels. Unfortunately, most approaches to data mining-based classification processes do not fully use all these three levels of information. As discussed above, most of the approaches to such processes only consider global significance (e.g., global support, confidence, entropy, or information gain), while others can estimate the global significance using incomplete information. Note that even though some measures like entropy select patterns are significant across all classes, they might not help in selecting a pattern with respect to a specific class. Finally, while certain approaches fully uses the global significance, and partially use the class significance of each pattern, such approaches generally do not use the local significance. Other pattern-based classification processes have similar deficiencies.

Methods of Data Classification

FIG. 1 is an example of building and using a classification model. At 102, a method 100 initializes a classification model that can be designed to contain a list of very short patterns for each class and allows patterns to appear in multiple classes. The very short patterns can be size-1 and size-2 patterns.

At 104, one or more training instances can be pre-processed to eliminate less significant features. The pre-processing can be designed to ensure coverage (e.g., no training instance is unrepresented). An example is illustrated below with respect to FIG. 2.

At 106, the training instances can contribute to the classification model by first including all of its remaining size-1 patterns to the pattern lists of all applicable classes in the classification model.

At 108, each size-1 pattern can be assigned an initial pattern weight. In an example, global support values for size-1 patterns can be used for the initial weights.

At 110, the training instances can then vote for k (where k can be a user-defined value) size-2 patterns, each of which can also be added to the pattern lists of the appropriate classes. The voting process can select the top k patterns for each training instance in a way that provides an effective balance between local, class, and global significance. In an example, a contingency table-based interestingness measure can be used to calculate class and global significance values. An example is illustrated below with respect to FIG. 3.

Weights assigned to size-1 and size-2 patterns do not lie on the same scale. This can be an artifact of their methods of calculation, rather than their relative importance. To accommodate the different scales, the weights can be normalized. Furthermore, based on empirical observation that size-2 patterns are generally more important than size-1 patterns, in an example, the weights of size-1 patterns can be scaled down with respect to the weights of size-2 patterns. In an example, the weights of size-1 patterns can be scaled down by a factor of four.

At 112, the pattern weights can be normalized. In an example, the normalization can be performed using z-score standardization, such as with more importance given to size-2 patterns. Realizing that z-score standardization assumes a normal distribution, which might not be true in some cases, other mechanisms to normalize the pattern weights are possible.

At 114, the pattern weights can be adjusted with respect to pattern significance within each class. In an example, the pattern weights can be adjusted using a power law based weight adjustment mechanism. In particular, in an example, normalized weights of patterns assigned to each class can be adjusted with respect to the class size and pattern support in the class such as by using a monotonically increasing weight adjustment scheme. In an example, better classification results can be achieved when mono(x)=$x^p$, with $0.05 <= p <= 0.10$. In an example, the value of p can be set to 0.07.

At 116, a test instance can be classified such as by first identifying all patterns in the test instance that also exist in the classification model. Thus, given a test instance T and a model m, the set of common patterns CP can represent the set of patterns that exist in both T and m. The set of common patterns CP includes both size-1 and size-2 patterns.

At 118, a scoring function can be used to obtain a score for each class in which a pattern from the test instance was found. In an example, the scoring function can consider both the pattern weights in the classification model and local pattern significance in the test instance.

One method of scoring can be such that given the set of common patterns CP and a class c, the first scoring function can use all (e.g., size-1 and size-2) patterns in CP that also exist in the pattern list of class c in model m such as to calculate the score of class c with respect to the test instance, such as by using the following equation:

$$Score(CP, c) = \sum_{i=1}^{|CP|} \begin{cases} TF_{CP_i} \times \text{weight}(CP_i, model_c) & \text{if } CP_i \in model_c \\ 0 & \text{if } CP_i \notin model_c \end{cases}$$

where TF is the term frequency of pattern $CP_i$ in the test instance for size-1 patterns and the average of the TF values of both atomic patterns in $CP_i$ for size-2 patterns.

Considering that the number of selected size-2 patterns in large sparse datasets can be large, accuracy can be improved such as by further filtering the patterns used for calculating class scores. This can be performed such as by only considering patterns that were selected (e.g., voted for) by at least one training instance that also belongs to the target class. As an example, consider a training set S where a size-2 pattern p only exists in instances t1, t2, and t3, that belong to classes c1, c2 and c3, respectively. If instances t1 and t3 also "selected" p as one of their top-k representative patterns, a large-sparse scoring function will not use pattern p to calculate scores against class c2.

At 120, a determination can be made whether the test instance is a single-label or a multi-label instance. When the test instance is a single-label instance, then at 122, the class with the highest score can be selected. When the test instance is a multi-label instance, then at 124, a weighted dominant factor-based scheme can be used to select multiple classes. The weighted dominant factor-based scheme can be based on the selected interestingness measure. In examples, the interestingness measure can be selected from Added Value, Mutual Information, Chi-Square, and Yule's Q.

It can be shown that reducing the dimensionality of the feature space can significantly improve the effectiveness and scalability of classification processes, especially on high-dimensional datasets. Furthermore, dimensionality reduction tends to reduce overfitting. Pattern-based classification processes can equally benefit from dimensionality reduction, as both the quality and the number of non-atomic patterns discovered can directly depend on the initial, atomic patterns (e.g., 1-itemsets).

Typically, features can be selected by first sorting all available features in terms of their significance, and then selecting top-n, or top-n-percent features (selecting a suitable value for n is not straightforward). Information gain, chi-square and bi-normal separation generally work equally well on a number of datasets, with no statistically significant difference. Considering the comparatively high computational cost of common feature selection methods, a hidden-web classification process can be used to adapt an efficient, two-phase approach. For example, in a first phase, Zipf's law can be applied as an inexpensive heuristic dimensionality reduction technique to eliminate too frequent and too rare features. In a second phase, a more expensive method can be applied to select the final set of features. Unfortunately, none of these approaches guarantee coverage (e.g., that each instance in the corpus represented by the selected features). Furthermore, the optimal number (or percentage) of features (e.g., the value of n) needed to achieve good classification results remains unclear. The consensus is inconclusive on n: some believe that the number of selected features should be same as the number of training examples, and others believe that feature selection can make matters worse, especially when the number of available features is small.

Figure 2:
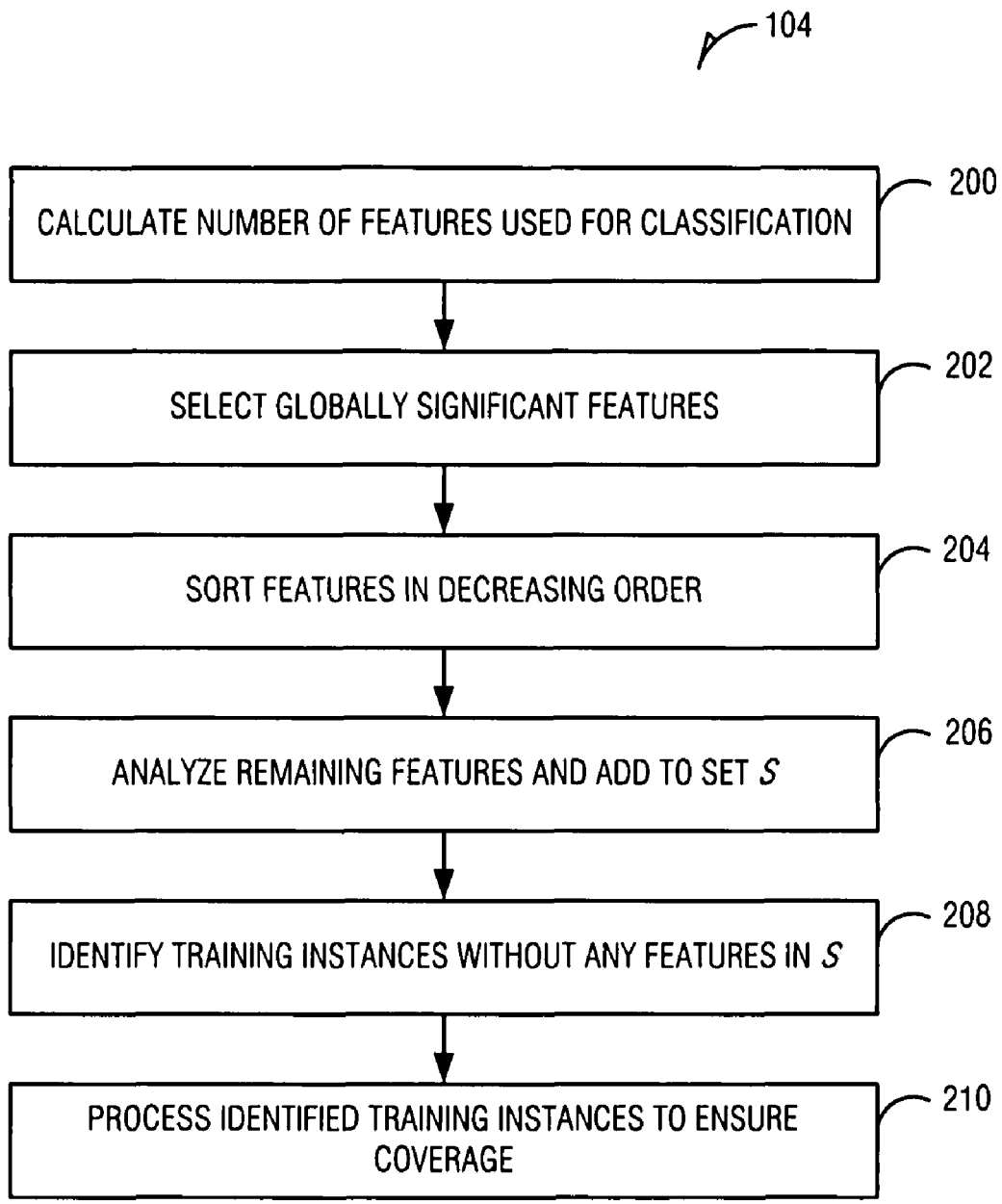
FIG. 2 is an example of eliminating less significant features.

FIG. 2 is an example of eliminating less significant features. In this example, the method 104 can include an adapted heuristic feature selection method that is efficient and that can ensure that the final set of selected features cover all training instances. At 200, the number of features n used for classification can be calculated. In an example, the number of features n can be calculated using the number of training instances i and the number of available features f, such as according to the equation:

$$n = i + \left(i \times \log\frac{f}{i}\right)$$

wherein i=number of training instances and f=total number of available features. This empirically derived formula can ensure a reasonable base amount for low dimensional datasets, while moderately growing this number for high dimensional datasets.

At 202, a heuristic can be applied to globally select the most useful features. In an example, Zipf's law or another technique can be used to select features that are neither too frequent, and nor too infrequent. For example, features can be selected that exist in less than 95% and more than 3 training instances.

At 204, the selected features can be further refined such as by ranking or sorting them such as in decreasing order. In an example, the sorting can be performed based on the features' information gain values.

At 206, the remaining features, which have been filtered and sorted, can be analyzed and the top-n features can be included in a set S, where S is the set of selected features.

At 208, all training instances without any features in S can be identified. As these training instances are not represented in S, further processing can ensure local coverage with respect to their features.

At 210, each training instance without a feature in S can be processed. In an example, the processing can include sorting the features in the training instance and including the top-t features in S. In a further example, all features can be sorted in a decreasing order of a metric, such as for example: TF*information gain, where TF=term frequency. The value t can range from relative small numbers (e.g., 2 or 3) to relatively large numbers (e.g., 50 or 100). In an example, the value of t can be set to 10.

Figure 3:
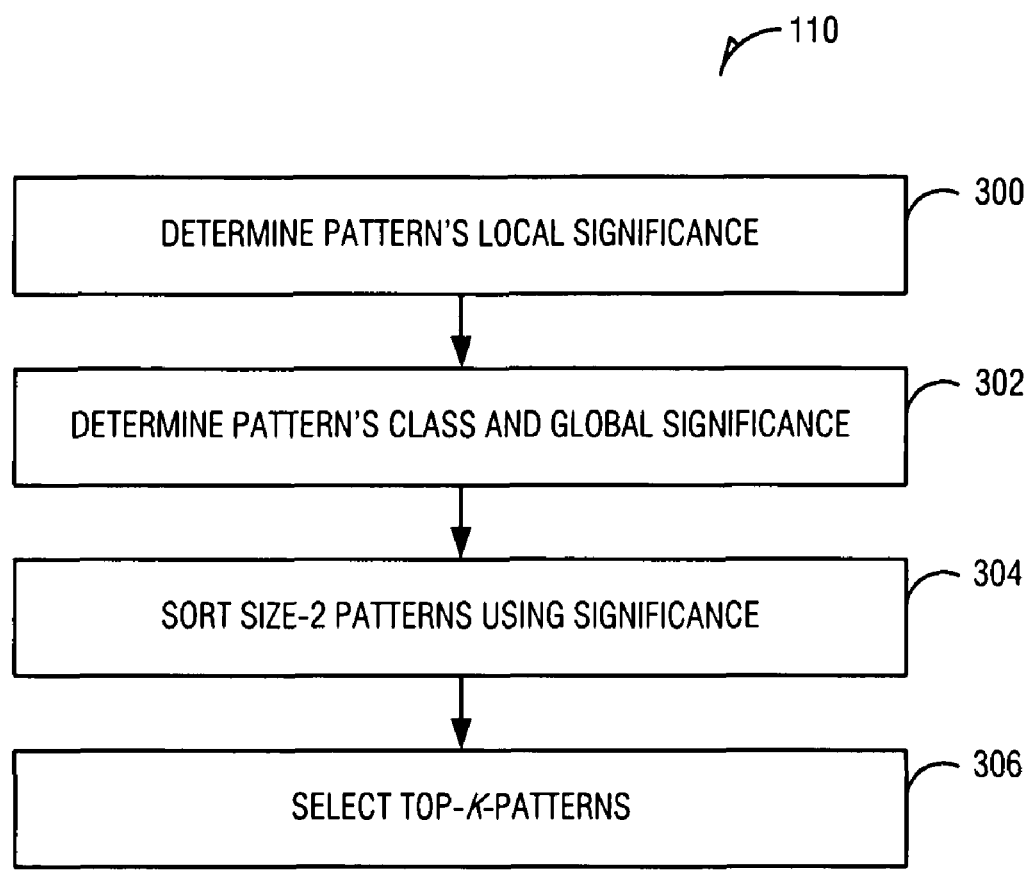
FIG. 3 is an example of selecting the top-k size-2 patterns in a training instance.

FIG. 3 is an example of selecting the top-k size-2 patterns in a training instance. Each pattern can be processed to compute the "overall" pattern significance such as with respect to the current training instance, for example, considering the pattern significance at the local, class, and global levels. At 300, the pattern's local significance can be determined. In an example, the local pattern significance can be calculated such as by averaging the TF values of both the atomic patterns (e.g., $p_i$ and $p_2$) in the size-2 pattern n size-2.

At 302, the pattern significance at a class and a global level can be determined. In an example, a common interestingness measure can be used. In particular, because training instances can belong to more than one class in a multi-label classification problem, the class significance can be determined such as by averaging or otherwise computing a central tendency of the pattern interestingness values such as with respect to each class applicable to the training instance. In certain examples, the interestingness measure can be selected from the group of: Added Value, Mutual Information, Chi-Square, and Yule's Q.

At 304, all size-2 patterns can be sorted such as according to their significance values. In an example, the list can be sorted such as in decreasing order of significance.

At 306, the top-k patterns can be selected to represent the training instance in the classification model, with global pattern significance used as the initial pattern weight.

FIG. 4 is a pseudo-code listing illustrating an example of a function to build a model given a training set, a user-defined value k, and an interestingness measure value, such as Added Value.

Examples of Data Classification Techniques

Certain pattern-based classification processes associate each selected pattern (e.g., rule) to a single class. In reality, a large percentage of patterns can appear in many training instances that might not be associated with the same class. Table 1 describes a training dataset used as a running example throughout this section. Pattern {b, d} appears in six training instances in this example. Two of these training instances (e.g., T1 and T10) are associated with class 0 whereas the other four are associated with class 1.

TABLE 1

| Instance ID | Feature-frequency pairs | Class ID |
| --- | --- | --- |
| T1 | (a:2), (b:4), (d:1) | 0 |
| T2 | (a:3), (c:1), (d:6), (e:1) | 0 |
| T3 | (b:2), (c:3), (d:1) | 1 |
| T4 | (b:3), (c:1), (d:2), (e:4) | 1 |
| T5 | (b:7), (c:2), (d:1) | 1 |
| T6 | (a:1), (b:1), (c:1), (e:1) | 0 |
| T7 | (b:9), (c:3), (f:4) | 1 |
| T8 | (c:6), (d:2) | 0 |
| T9 | (b:3), (d:2), (e:6) | 1 |
| T10 | (a:4), (b:2), (d:7), (f:3) | 0 |
| T11 | (c:1), (e:1), (f:1) | 1 |

Associating this pattern to only one of these classes might not fully capture its significance in the training set. Instead of making such a Boolean decision, or eliminating these "shared" patterns as "confusing" or "insignificant", the present inventors have recognized that patterns can be allowed to appear in multiple classes such as with weights representing their significance in each applicable class.

Additionally, training instances in many real-life datasets (e.g., text and web datasets) can contain a feature (e.g., atomic pattern) more than once. These local feature frequency counts are largely ignored by certain processes that only consider Boolean presence or absence of features in training instances to select patterns used for classification. The present inventors have recognized that these local feature frequencies can provide useful insights about a pattern's significance with respect to a training instance. As an example, consider a news article about certain types of dinosaurs that are believed to be good swimmers. The word "dinosaurs" can occur 19 times in the entire article whereas the word "marine" can occur only once. Clearly, considering both of these words with equal importance can be problematic. Therefore, by accommodating local frequencies, the training process can achieve a balance between global, class, and local significance. Note that considering features with high local frequencies is not the same as considering features with high support.

Considering the training instance T1 in Table 1, and pattern {a, b}, we can calculate the local pattern significance such as by averaging or otherwise computing central tendency of the TFs of atomic patterns 'a' (e.g., 2/7=0.285) and 'b' (e.g., 4/7=0.571), e.g., 0.428. The class significance of pattern {a, b} can be obtained, such as by calculating the value of the selected interestingness measure using a contingency table, which can be formed using the frequencies of atomic patterns 'a' (e.g., 4) and 'b' (e.g., 3) in class 0, where N=5 (e.g., number of instances in class 0). Similarly, the global significance of pattern {a, b} can be obtained, such as by calculating the value of the selected interestingness measure using a contingency table that considers the frequencies of atomic patterns 'a' (e.g., 4) and 'b' (e.g., 8) in the whole training set, where N=11 (e.g., the total number of instances in the training set).

Recap of Data Classification Techniques

A short-pattern-based classification process was described. In addition to size-1 patterns, the process can select top-k size-2 patterns to represent each training instance, which can provide an effective balance between local, class and global significance. The pattern assignment scheme allows patterns to appear in the classification model of multiple classes, such as with a unique, power law based scheme used to adjust pattern weights. Furthermore, the scheme can replace hard-to-generalize minimum support and confidence thresholds with k and an interestingness measure, parameters that are robust across datasets. With ten-fold cross-validated results of experiments performed on a large number of datasets, the process achieves overall classification results that are better then the best of existing machine learning and data mining-based classification processes, with most significant gains realized on real-life, noisy, web datasets. In addition, the process ran about 3.5× faster then the fastest existing classification process.

A more robust scheme to replace z-score standardization and other ways of assigning weights to size-1 patterns can be implemented. The process can also be applied in other domains.

Overview of Data Clustering Techniques Using Closed Interesting Itemsets

Organizing data into a tree-like hierarchy has many applications. A hierarchy provides a view of the data at different levels of abstraction, helping users deal with the common issue of information overload. As the user expands nodes at different levels in the hierarchy, the structure within the broad topic becomes more apparent as parent and child nodes are organized in a general to specific fashion. These benefits make hierarchies a good choice to organize large collections of documents or to produce cluster hierarchies from document collections.

Agglomerative and partitioning-based approaches represent two categories of hierarchical document clustering techniques. Certain agglomerative approaches start with a singleton cluster for each document and build the hierarchy bottom-up by applying various pair-wise similarity measures on clusters, merging the cluster pair with highest similarity at each action, until one cluster remains. Agglomerative approaches generally suffer from their inability to perform adjustments once a merge is performed, which can result in lower clustering accuracy. These approaches can also have a very high computational cost, which can make them infeasible for large document datasets. On the other hand, typical partitioning approaches obtain hierarchical clustering solutions via a sequence of repeated bisections and are generally scalable and efficient. One partitioning approach showed that Unweighted Pair Group Method with Arithmetic Mean (UPGMA) and bisecting k-means, a variant of standard k-means are the most accurate agglomerative and partitioning methods, respectively. Furthermore, another approach showed that the $I_2$ criterion function outperforms other criterion functions when used with bisecting k-means.

One approach in hierarchical document clustering is to use frequent itemsets to produce cluster hierarchies. Hierarchical Frequent Term-based Clustering (HFTC) is a first technique in this class and achieves accuracy comparable to 9-secting k-means, and worse than bisecting k-means. However, HFTC is generally not scalable for large document collections unlike another technique of Frequent Itemset-based Hierarchical Clustering (FIHC); a frequent itemset based clustering approach that claims to outperform HFTC and the certain agglomerative and partitional methods (e.g., UPGMA and bisecting k-means) both in terms of accuracy and scalability. Another approach is Topic Directory with Nonparametric Closed Termset Mining (TDC) that uses closed frequent itemsets and further reduces dimensionality, while improving the clustering quality and scalability over FIHC. In some examples, both FIHC and TDC actually perform worse than UPGMA and bisecting k-means.

"Closed interesting itemsets" are based on the observation that higher frequency does not necessarily mean higher quality, from extrapolating ideas from research in selecting the most interesting association rules, and closed frequent itemset mining. In an example, a programmatically simple and parallelizable technique can be used with heuristics such as to efficiently mine these types of itemsets. Our extensive experiments performed on standard datasets of varying characteristics and sizes show that using the same support threshold for first level (single word) itemsets results in significantly smaller number of "closed interesting" itemsets as compare to the number of closed frequent itemsets generated. Even so, when used for hierarchical document clustering, we can show that "closed interesting" itemsets outperform certain clustering techniques, indicating their superior quality.

In an example, a technique includes a hierarchy assembling approach that supports soft clustering and prunes unwanted itemsets on the way. In order to make the hierarchy more compact, some approaches can use agglomerative clustering to merge the first-level nodes. Although significantly less expensive than applying agglomerative clustering on the whole dataset, this action is still typically very expensive. Bisecting k-means can be used to reduce computational complexity of this action. In other examples, various implementation-level improvements or optimizations can be included, such as described herein.

Frequent itemset mining often results in too many itemsets. Using a faster mining technique may not help as typically itemset mining is fundamentally a combinatorial issue and the mining time exponentially increases as the support threshold linearly decreases. In some examples, a large percentage of frequent itemsets share support with one or more of their parent (subset) itemsets. These child itemsets may be insignificant as they represent "specialization" of the more general concept represented by the parent itemset. In an example, "closed" frequent itemset mining uses "closeness" for large itemset generation. Specifically, in addition to meeting a minimum support threshold, closed frequent itemsets may also have to meet a frequency closeness criteria, that is, they have support that is different from (practically less than) any of their subset itemsets. Generally, these characteristics result in a smaller number of closed frequent itemsets when compared with the number of frequent itemsets found on the same dataset using the same support threshold. Closed frequent itemsets can provide better performance than frequent itemsets in a number of applications, such as hierarchical document clustering, in an example.

Finding the most interesting association rules is another area of data mining. A number of association rules can be generated from each large itemset at each level, which can result in a large association rule base, especially when attributes in the data set are highly correlated. A low support threshold results in too many discovered associations. Increasing the support threshold significantly reduces the number of rules discovered, but risks losing useful associations, especially on uneven datasets. On the other hand, Confidence is criticized because of its asymmetric property and its failure to incorporate the baseline frequency of the consequent. In addition, it is non-trivial to set good values for support and confidence thresholds; it depends on the size of dataset, sparseness of data, and the particular issue under study. Considering these issues, some other interestingness measures to evaluate and rank discovered associations are available. Extrapolating from various statistical and mathematical principles, these measures can be less sensitive to the properties of specific datasets.

In one example, combining the stronger aspects of closed frequent itemset mining with techniques used in finding the most interesting association rules can be used to define "closed interesting" itemsets.

In certain examples, these closed interesting itemsets retain the "closeness" property of closed frequent itemsets, but replace the minimum support characteristic with a threshold of a symmetric, statistically inspired objective interestingness measure. Table 2 lists some examples of such thresholds. Some of these measures are not inherently symmetric and can be converted to a symmetric version such as by calculating the interestingness values for both directions and selecting the maximum value, in some examples.

TABLE 2

List of interestingness measures

| # | Symbol | Interestingness Measure | Threshold |
|---|--------|------------------------|-----------|
| 1 | AV | Added Value | 0.4 |
| 2 | c | Symmetric Confidence | 0.6 |

TABLE 2-continued

List of interestingness measures

| # | Symbol | Interestingness Measure | Threshold |
|---|--------|------------------------|-----------|
| 3 | F | Certainty Factor | 0.4 |
| 4 | $\chi^2$ | Chi-Square | unit = 50, p = 3000 |
| 5 | S | Collective Strength | 1.45 |
| 6 | V | Conviction | 1.7 |
| 7 | Φ | Correlation Coefficient | 0.35 |
| 8 | IS | Cosine | 0.33 |
| 9 | G | Gini Index | 0.017 |
| 10 | I | Interest | 12 |
| 11 | ζ | Jaccard | 0.23 |
| 12 | J | J-Measure | 0.02 |
| 13 | κ | Kappa | 0.35 |
| 14 | K | Klosgen's | 0.068 |
| 15 | L | Laplace | 0.6 |
| 16 | M | Mutual Information | 0.1 |
| 17 | α | Odds Ratio | 25 |
| 18 | RI | Piatetsky Shapiros Interest | 0.02 |
| 19 | Q | Yule's Q | 0.85 |
| 20 | Y | Yule's Y | 0.65 |

In some examples, some of the measures meant to calculate correlation or interdependence between two-way contingency tables (e.g., two variables) can make them unusable for generating "closed interesting" itemsets with more than two items. While measures like log-linear analysis exist to calculate interdependence between multi-way contingency tables, they are computationally expensive.

In an example, a simple greedy heuristic (super item) can be used to deal with this issue:

Super item: If an itemset p at level k is used to generate a candidate itemset q at level k+1 (e.g., itemset q contains all k-items from itemset p, and exactly one additional item u), all items in itemset p are used to form a super item v, with support (v)=support (p). Items v and u are used to form a two-way contingency table and to calculate interestingness values.

Example: Considering a dataset of 200 transactions, support (A)=98, support (B)=120, support (C)=65, support (A, B)=80 and support (A, B, C)=45. If itemset "A, B" at level 2 is used to generate a candidate itemset "A, B, C" for level 3, a super item v can be formed with support (v)=support (A, B)=80. Since "C" is the additional item in the candidate itemset, a contingency table can be formed between v and C, as shown in Table 3.

TABLE 3 a 2 × 2 contingency table between super item "v" and item "C"

|  | C | ¬C | Total |
|---|---|---|---|
| v | 45 | 35 | 80 |
| ¬v | 20 | 100 | 120 |
| Total | 65 | 135 | 200 |

Using the contingency table shown in Table 3 and "Correlation Coefficient" as interestingness measure, an interestingness value of 0.414 can be obtained, which indicates that the super item v and item C are positively correlated.

In an example, candidate itemsets for level k can be pruned if any of their k subsets of size k-1 do not exist in the previous level, with a caveat that frequent itemset mining uses support that has a downward closure property. In an example, pruning can provide an increase in the quality and a reduction in the number of "closed interesting" itemsets generated.

Figure 5:
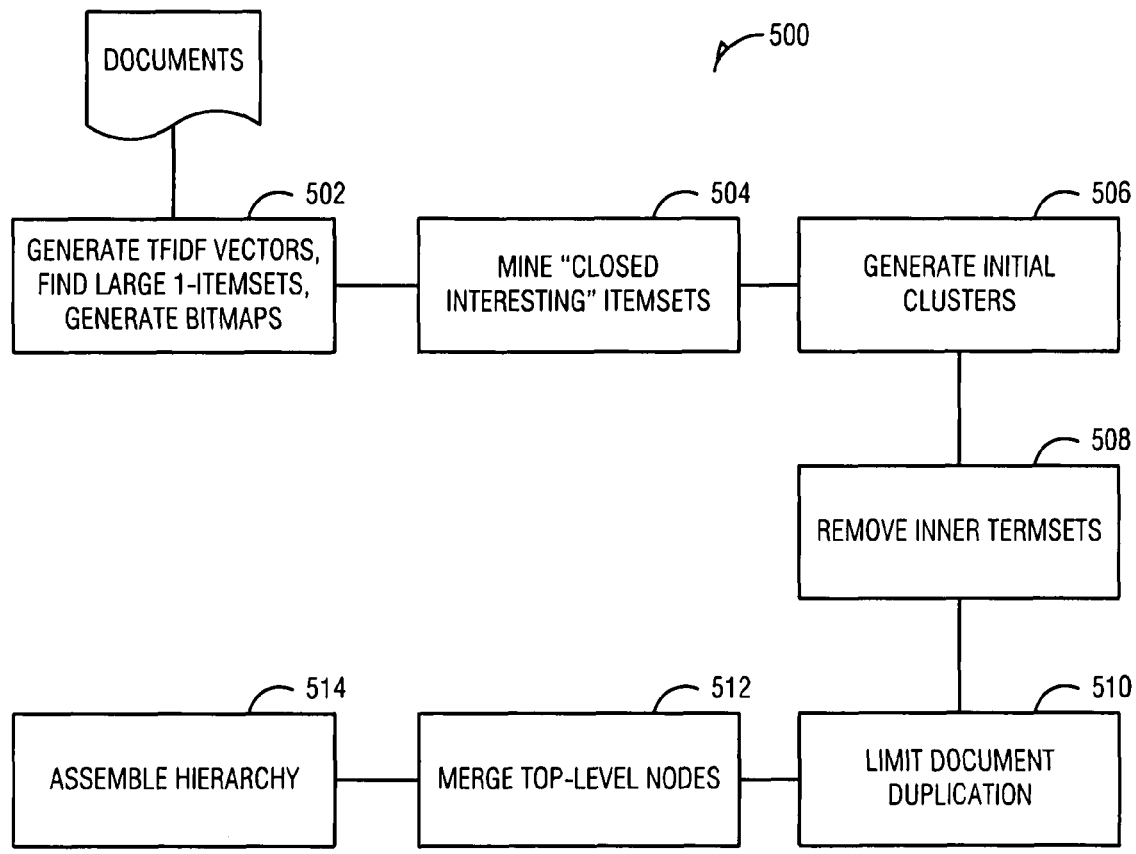
FIG. 5 is an example of a hierarchical document clustering process.

FIG. 5 is an example of a hierarchical document clustering process 500.

At 502, TFIDF vectors are generated using documents. Using the result, large 1-itemsets are found and used to generate bitmaps. In an example, a technique starts with mining large 1-itemsets (individual words) in a way similar to frequent itemset mining. In an example, a very low support threshold can be used for this action. Using a low threshold can result in better quality itemsets. One reason can be that using a high support threshold can result in pruning useful associations.

At 504, "closed interesting" itemsets can be mined. Each of the $k^{th}$ actions (where k>=2) form candidate itemsets by considering all "closed interesting" itemsets found in $k-1^{th}$ action as super items, and adding the unique individual items that follow the last item in the super item. Each candidate can be checked for downward closure and closeness. Closeness can be tested using a frequency closeness criterion, such that a candidate itemset is not allowed to have the same support (frequency) as any one of its parents. Candidates that satisfy both criteria can be checked for meeting an interestingness threshold. Candidates that satisfy all three criteria can be added to the list of "closed interesting" itemsets for action k. Mining can stop when all "closed interesting" itemsets are found. FIG. 6 is a pseudo-code listing illustrating an example of a function, to mine "closed interesting" itemsets.

In FIG. 5, at 506, initial clusters can be generated. The hierarchy construction approach described herein focuses on the selection of parent nodes. For example, an initial cluster can be formed for each "closed interesting" itemset, containing all documents that contain the itemset, with items in the itemset used as the cluster label. These clusters can be readily available as a byproduct of calculating support using the bitmap-based representation discussed in block 502. These initial clusters are not disjoint, as a document can contain multiple "closed interesting" itemsets of varying sizes. This allows selecting multiple parents such as by using the interestingness between parent and child nodes without inspecting cluster contents.

At 508, inner termsets can be removed. If a document is included in multiple clusters that are based on itemsets of varying sizes, document duplication can be reduced such as by pruning the document from all but the largest clusters based on the largest sized itemsets. When these itemsets can be used to build the hierarchy, this action results in each document assigned to all applicable nodes at the highest possible (e.g., most specific) level in the hierarchy. FIG. 7 is a pseudo-code listing illustrating an example of a function to prune documents in a single pass on discovered "closed interesting" itemsets, without requiring processing individual documents. The technique can start by allocating a global, and individual coverage maps for each level, where the number of levels is equal to the size of largest discovered itemset. A level coverage map is similar to an itemset bitmap, however, an itemset bitmap indicates documents that contain the itemset whereas a level coverage (bit) map indicates documents that contain any itemset at that level. Similarly, the global coverage map indicates documents that contain any discovered itemset. Levels can be iterated in largest to smallest order and at each level; bitmaps of all itemsets that exist at that level can be ANDed with inverse of bits in global coverage map, which results in eliminating documents that already existed at a higher level. The updated bitmap can be used to update the current level's coverage map. Finally, after each level, the current level's documents can be added to the global coverage map. This results in pruning documents from all but their largest-sized itemsets.

Example: Considering a dataset of 10 documents, and itemset x at level i, with $bitmap_x$={0100100001}, and global map updated with all documents that exist on levels i+1 to k, such as global_map={0010100101}, we have:

$$\begin{array}{ll} bitmap_x & = \{0100100001\} \\ \text{NOT global\_map} & = \{1101011010\} \text{ AND} \\ \hline bitmap_x & = \{0100000000\} \end{array}$$

Note that in this example two documents were pruned from bitmap$_x$, as they existed in itemset(s) at a higher level.

In FIG. 5, at 510, document duplication is limited. The inner-termset removal technique (FIG. 6) also prepares coverage maps for individual levels. These coverage maps can be used to limit document duplication at the same (their largest) level, as inner-termset removal eliminates documents from all but their largest applicable itemsets, and documents can still exist in multiple itemsets at their largest level. Using level coverage maps, documents that exist at each level can be checked for existence in itemsets (clusters) at that level. If a document exists in more than MAX_DOC_DUP (user defined parameter) itemsets, a score can be calculated such as against each matching itemset and the document can be assigned to MAX_DOC_DUP itemsets with highest scores. A score calculation method can be used, similar to TDC, which uses the document's TFIDF (Term Frequency+Inverse Document Frequency) vector (e.g., including large 1-itemsets only) and adds the term frequencies of items that existed in the itemset.

At 512, a hierarchy can be assembled. TDC can build the hierarchy by linking each itemset of size k with all of its (up to k) subsets at level k−1. This approach can result in boosting FScore, but could impact the overall clustering quality because of too much node duplication. On the other hand, FIHC applies an expensive similarity calculation method, which first prepares a conceptual document for each node (e.g., by merging the TFIDF vectors of all documents that exist in the node or any of its children) and calculates a score against each of its parents (up to k). The node can be linked to the parent with the highest similarity. This method can be expensive because it involves preparing conceptual documents for nodes at all levels in the hierarchy (conceptual documents for first level are not needed by this action, but at the time of merging first level nodes later), and also because the similarity calculation method uses the notion of "cluster frequent items" which involves an additional act to find these items for each node, using the documents that exist in that node and any of its child nodes. It also adds another parameter to the system (e.g., "minimum cluster support") and, as discussed earlier, support thresholds are often not easy to generalize. Finally, assigning each node to exactly one parent does not support soft clustering, which is a helpful element of real-life hierarchies. As an illustrative example, a large number of nodes in the "Yahoo Directory" are cross-linked between various categories.

To avoid both extremes (e.g., TDC, which assigns each node to all available parents and FIHC which assigns each node to exactly one parent), a more balanced approach that assigns each node to up to a user-defined number of best matching parents can be used. One example method is further computationally efficient, as it need not prepare conceptual documents for nodes at various levels in the hierarchy and also need not calculate cluster support, and hence, avoids the additional mining action. Instead, we can use the same "interestingness" measure that was used to mine "closed interesting" itemsets in the previous action, and our "super item" heuristic to calculate the interestingness between the itemset at level k and its (up to k) parent itemsets at level k−1 (e.g., by considering the parent itemset as super item). A node can be linked to up to MAX_NODE_DUP (user defined parameter) parents with the highest interestingness values. This method need not look into the documents included in the cluster and can select parents solely using the itemsets (e.g., cluster labels).

FIG. 8 is a pseudo-code listing illustrating an example of a function to construct a hierarchy from the bottom up. Because of inner termset removal and constraining maximum document duplication, a number of itemsets may no longer have any documents associated to them (e.g., empty clusters). These itemsets can be pruned on the way unless they were used as parent by a node at level k+1.

In FIG. 5, at 514, top-level nodes can be merged. Generally, itemset mining results in a large number of large 1-itemsets (frequent single words) making the hierarchy very sparse on the first-level. Removing inner termsets and constraining document duplication result in a number of empty clusters, which can be pruned during the hierarchy construction. Still, there can be a large number of nodes at level 1. In an example, a technique merges the first level nodes to reduce sparseness of the hierarchy.

TDC uses a heuristic to compute pair-wise similarities. At each iteration the pair with highest similarity can be merged, such as in a way similar to agglomerative clustering. This heuristic can use the number of common documents between nodes as the primary goodness criteria. We found this heuristic to be potentially problematic, as it does not support hard clustering (e.g., MAX_DOC_DUP=1 results in no common docs between nodes), and does not consider the actual similarities between clusters. FIHC, on the other hand, can apply agglomerative clustering on first level nodes and can use a similarity function similar to the one it uses for selecting parents during hierarchy construction. This function can use the notion of "cluster frequent items" and can inspect the documents assigned to each node, and all of its children to find these items, making it very expensive.

Thus, at 514, conceptual documents for first-level nodes can be prepared, such as by merging term frequencies of large 1-itemsets from all applicable documents in the cluster. This can result in being significantly less expensive than other methods. Then, a bisecting k-means can be applied such as by using the I$_2$ criterion function on these conceptual document vectors, reducing the computational complexity of this action from O(n$^2$*log(n)) to O(e*log(k)), where n is the number of first-level nodes, and e=the number of non-zero entries in the feature vectors of all conceptual documents. Note that applying bisecting k-means on the conceptual document vectors of first-level nodes can be significantly less expensive than applying bisecting k-means on all document vectors in the data set, which can make this approach more scalable than certain approaches including bisecting k-means.

Recap of Data Clustering Techniques Using Closed Interesting Itemsets

Using a closeness property and interesting association rules, in certain examples, these itemsets can provide significant dimensionality reduction over closed frequent itemsets. Using these itemsets, a hierarchical document clustering approach can outperform certain other approaches, such as both in terms of FScore and Entropy on a large number of standard datasets. In addition, the approach scales sub-linearly and was able to cluster 200K documents in less than a minute. A parallel-processing version of the approach achieved the same task in around 40 seconds. Based on a principled threshold identification technique, it can be shown that a small number of statistically inspired interestingness measures generalize well to a large number of datasets, without requiring parameter tuning. "Closed interesting" itemsets can serve as a superior replacement for frequent and closed frequent itemsets in a variety of application domains. In addition, improved or optimized frequent, and closed frequent itemset mining (e.g., FP-Trees) can help the performance of mining "closed interesting" itemsets.

Overview of Data Clustering Techniques Using Patterns

The present inventors have recognized that the quality of clustering achieved by certain flat clustering techniques (e.g., k-means clustering) can rely heavily on the desired number of clusters (e.g., the value of k), which must be known in advance. Unfortunately, finding the right number of clusters is a non-trivial problem and no successful methods are believed to exist to automatically determine this value for a new, previously unseen dataset. Therefore, these techniques require the user to provide the appropriate number of clusters. This approach, however, can be problematic because users with different backgrounds and varying levels of domain expertise can provide different values for k. Consequently, a clustering solution obtained by one user may not satisfy the needs of other users.

In trying to avoid these problems, hierarchical clustering can be used as a practical alternate to flat clustering. Nodes in a hierarchical clustering solution can be organized in a general to specific fashion, and users can have an option to analyze data at various levels of abstraction such as by expanding and collapsing these nodes.

Hierarchical clustering techniques can include agglomerative techniques like UPGMA, and partitioning based techniques like bisecting k-means. Additionally, a number of pattern-based hierarchical clustering techniques can achieve initial successes on a variety of datasets. These techniques come with an added advantage of automatically identifying cluster labels (e.g., the set of atomic patterns defining each cluster), and many of them can support soft clustering. However, these features are not readily available in agglomerative and partitioning based techniques. Thus, the present inventors have recognized, among other things, that there are at least three major problems with existing pattern-based hierarchical clustering techniques.

The first major problem is that globally significant patterns may be overly sensitive to threshold values. Certain pattern-based hierarchical clustering techniques follow a similar framework. These techniques first mine a set of globally significant patterns (e.g., frequent itemsets, closed frequent itemsets, high h-confidence itemsets, or closed interesting itemsets), and then use these patterns to build the cluster hierarchy. Instances can be assigned to one or more applicable nodes (e.g., patterns) and various heuristics can be applied to eliminate insignificant nodes.

Most of the above mentioned pattern-based hierarchical clustering techniques use a user defined threshold (e.g., minimum support, minimum h-confidence, etc.) to prune an exponentially large search space, and to obtain the final set of globally significant patterns used for clustering. Consequently, these techniques face two potential problems. First, the final set of globally significant patterns might not cover all instances, especially on datasets with a high degree of imbalance in cluster sizes. Second, the number of globally significant patterns found heavily depends on the threshold value used. On high dimensional, highly correlated datasets with many shared patterns, the number of these patterns can even be tens to thousands of times higher than the number of instances in the dataset. The excessive number of patterns can even cause global pattern-based techniques to fail. We can replace minimum support with a more stable interestingness threshold, which can reduce the initial number of globally significant patterns. Still, it would be undesirable if there was no way to set an upper bound on the number of patterns, and if the final set of global patterns sometimes did not cover all instances.

Additionally, instances in many text and web datasets may contain a feature (e.g., atomic pattern) more than once. Certain techniques do not fully use these local feature frequencies. Some approaches use these values in scoring functions to select suitable hierarchy nodes for instances, or to select node parents. However, no approach uses a local pattern significance measure in the process of mining the initial set of patterns used for clustering. For example, we observe that local feature frequencies can provide useful insights about a pattern's significance with respect to an instance. Consider a news article about certain types of dinosaurs that are believed to be good swimmers. The word "dinosaurs" may occur 19 times in the entire article whereas the word "marine" may occur only once. Clearly, considering both of these words with equal importance can be problematic.

The second major problem is that there can be an unnecessary coupling between pattern size and node height. Many pattern-based clustering techniques tightly couple the sizes of cluster labels with the node heights in the initial cluster hierarchy. In these approaches, the first level in the cluster hierarchy contains all size-1 patterns; the second level contains all size-2 patterns; and so on. This tight coupling is merely a consequence of the way global patterns are discovered (e.g., by first discovering size-1 patterns, which are used to form size-2 candidates etc.), and does not necessarily reflect a real-life setting, where users would appreciate more descriptive cluster labels.

The third major problem is that there are artificial constraints on soft clustering. Instances in real-life datasets may contain multiple patterns in the corresponding cluster hierarchy. As a consequence, pattern-based hierarchical clustering techniques more easily support soft clustering when compared with hierarchical clustering techniques. However, certain techniques require the user to provide "maximum instance duplication" as an input parameter and always select the maximum number of clusters whenever possible for each instance. This approach can be problematic for real life datasets where different instances can belong to a different number of topics, and the same maximum value may not work for all instances.

Additionally, instead of allowing instances to exist in the most suitable clusters at any level in the hierarchy, some of these approaches first force all instances to their most specific levels (e.g., called "inner termsetremoval") and then select the top-n (with n being user defined) most suitable clusters at that level. This restriction appears to be a matter of convenience (e.g., a quick way of constraining instance duplication) and may not be useful for real-life hierarchies.

One approach to overcome these problems includes a pattern-based, hierarchical clustering technique, which is briefly described here. Instead of following a framework of first mining globally significant patterns and then using these patterns to build the cluster hierarchy, the technique can first allow each instance to "vote" for a variable number of representative size-2 patterns, such as in a way that ensures an effective balance between local and global pattern significance. At this action, the number of votes permitted can be dynamically determined such as by using a standard deviation or like dispersion-based scheme, upper bounded by a small constant maxK. Because there is no global pattern mining action, a global threshold (e.g., minimum support) need not be used. Furthermore, the number of initial size-2 patterns will be linear to the total number of instances in the dataset, and all instances are will be covered.

Next, these initial clusters can be refined to obtain the rest of the cluster hierarchy such as by following a novel iterative instance driven process that can avoid combinatorial explosion. This process can directly find clusters for the next level, and can prune duplicate clusters in each iteration. In addition, this process can produce more descriptive cluster labels without tightly coupling node label sizes with node heights in the initial cluster hierarchy. This can also avoid forcing instances to their longest pattern clusters and can enable instances to exist at multiple levels in the hierarchy.

With results of experiments performed on 40 standard datasets, the technique can be shown to outperform certain hierarchical clustering techniques both in terms of FScore and Entropy. Furthermore, the parameters can be robust across datasets and the same un-tuned parameter values achieved high clustering quality on all datasets used in our experiments. Tuning these parameters to each dataset can increase performance even further.

Method of Data Clustering Using Patterns

Figure 9:
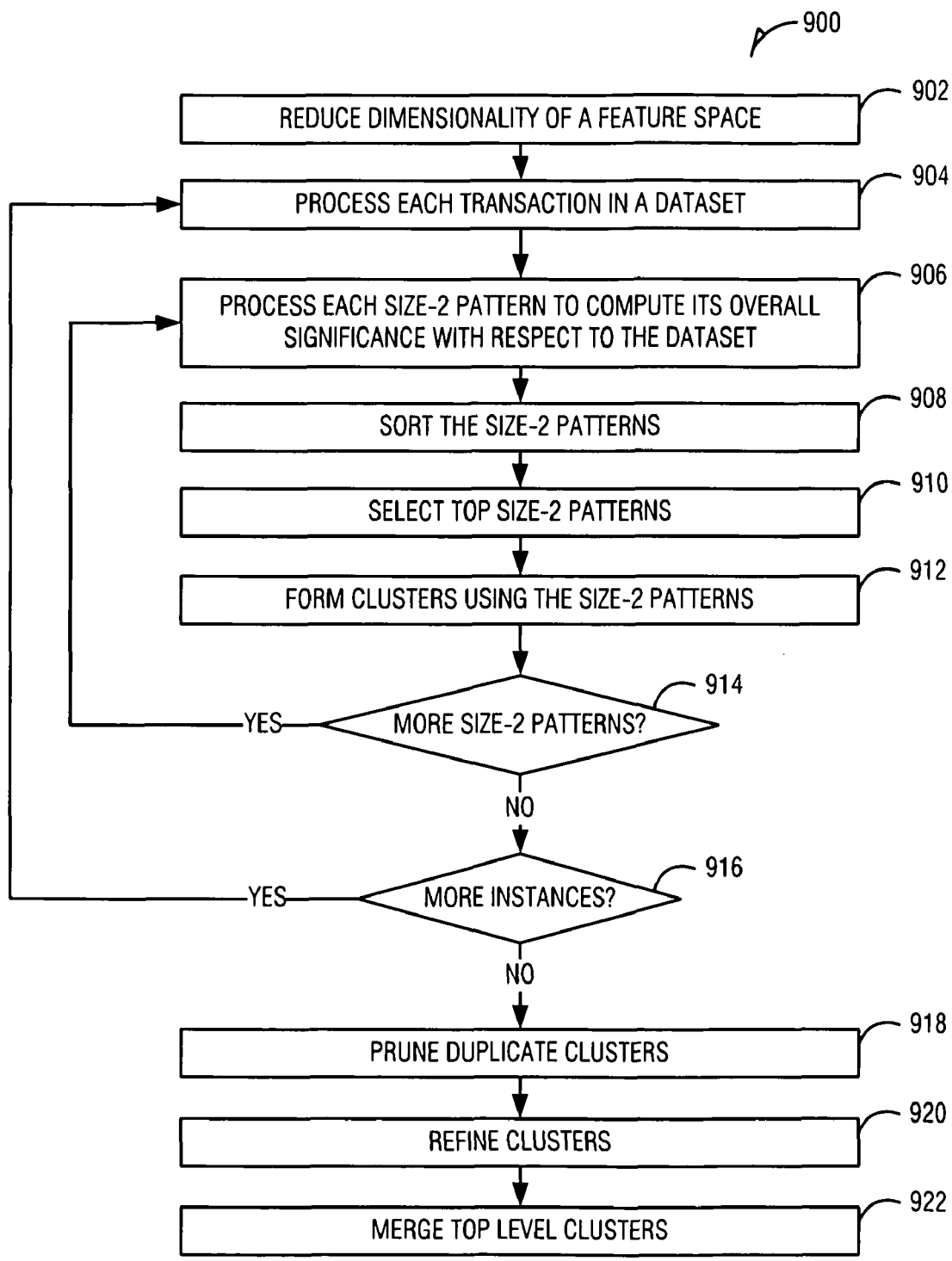
FIG. 9 is an example of building a data hierarchy.

FIG. 9 is an example of building a data hierarchy. At 902, the dimensionality of a feature space can be reduced. Dimensionality reduction can be an optional action, in an example. However, reducing the dimensionality of the feature space can significantly improve the performance of pattern-based clustering approaches, as the number of non-atomic patterns discovered directly depends on the initial atomic patterns (e.g., 1-itemsets). The availability of a labeled training set in supervised problems (e.g., classification) can allow for applying more sophisticated dimensionality reduction (e.g., feature selection) techniques like information gain. In contrast, there may be limited information (e.g., global and local feature frequencies) available in unsupervised problems like clustering. Therefore, certain pattern-based clustering techniques can use a global threshold (e.g., minimum support) as the primary dimensionality reduction technique. Such approaches may not be able to guarantee coverage though.

To address the need to reduce dimensionality while helping ensure coverage, a two-phased heuristic approach is described. In the first phase, initial features can be selected. In an example, the globally most useful features can be heuristically selected such as by applying Zipf's law or the like to select features that are neither too frequent, and nor too infrequent. By way of example, but not by way of limitation, our experiments selected features that exist in less than 95%, and at least 2 instances.

In the second phase, the following method can be performed: for each instance i in the dataset, first sort all features in i in the decreasing order of their local frequencies. Next, select the top-k highest frequency features and add them to the set of selected features. By empirical evaluation it appears that that k=10 works well in practice and it appears insensitive to the dataset. Consequently, by way of example, but not by way of limitation, this value is used in this description.

At 904, each transaction instance in a dataset can be processed.

At 906, each size-2 pattern in a transaction instance can be processed to compute its "overall" significance with respect to the current instance. First, the local pattern significance can be determined, such as by averaging or computing another measure of central tendency of the local frequencies of both of the atomic patterns (e.g., $p_1$ and $p_2$) in the size-2 pattern (e.g., p). Next, a common interestingness measure can be used to determine the global pattern significance. An evaluation of 22 interestingness measures in the context of global pattern-based hierarchical clustering revealed that only a small number of measures were stable across datasets. These stable measures can be useful to determine the global significance values in this context. Recognizing that most of the interestingness measures are based on probability, multiplying the local and global significance values to determine the overall pattern significance with respect to the current instance can be performed.

At 908, the size-2 patterns can be sorted. All size-2 patterns can then be sorted in decreasing order of their overall within-instance significance values, and these significance values can also be used to calculate the mean and standard deviation of local significance. Using a dynamic standard deviation based scheme that selects a variable number of most significant patterns (e.g., initial clusters) for each instance may overcome the problem of artificial constraints on soft clustering, as discussed above.

At 912, a number of the top size-2 patterns can be selected. In an example, the top-maxK size-2 patterns with significance values that are greater than or equal to a minimum standard deviation (min_std_dev) can be selected, where maxK and min_std_dev are user-defined values. This scheme selects up to maxK patterns with significance values that are greater than or equal to "min_std_dev" standard deviations from the mean, where maxK and min_std_dev can be user defined parameters. Furthermore, to ensure coverage and account for boundary conditions (e.g., instances with a very small number of patterns) the most-significant pattern can always be selected, if desired.

At 914, clusters can be formed using the size-2 patterns. Once size-2 patterns can be selected for all instances, each unique size-2 pattern forms an initial cluster and instances can be associated to the pattern clusters they selected. A list of pointers can be maintained for each instance to track instance-to-cluster relationships.

At 916, if there are more size-2 patterns in the current instance, then the method 900 can return to block 906 and continue processing. Otherwise, the method 900 can fall through to block 918.

At 918, if there are more instances to process, then the method 900 can return to block 904 and continue processing. Otherwise, the method 900 can fall through to block 920.

At 920, duplicate clusters can be pruned. The set of initial clusters can contain duplicates (e.g., clusters with different labels but the exact same instances). In an example, one way of performing this operation includes comparing each cluster with all other clusters (e.g., quadratic time). Fortunately, as a positive consequence of our instance driven approach, instance-to-cluster relationships are already known. Further, it can be shown that checking for and pruning duplicate clusters locally also prunes all global duplicates. Thus, in an example, duplicates can be pruned within each cluster.

At 922, clusters can be refined. Once the initial clusters are available and duplicates from these clusters are pruned, an iterative cluster refinement process can be used to generate the rest of the cluster hierarchy, such as by making patterns progressively longer and cluster memberships progressively sparser. Two aspects become evident. First, atomic clusters (e.g., clusters with only one instance) cannot be any more specific. Therefore, there is no need to consider these clusters for refinement (e.g., to generate child nodes for the next level). Second, refinement is only needed when a cluster c1 shares some instances with another cluster c2. These common instances can be removed from both c1 and c2, and added to a node that is a child to both of these nodes. This refined node still retains the instance memberships of the originating clusters for retrieval purposes (e.g., as child nodes can be considered as a specialization to, and therefore a part of, their parents). Furthermore, this determination of overlap can exploit instance to cluster pointers in a way similar to our duplicate cluster pruning scheme.

Hierarchy refinement can continue from level to level. Efficiency can be maintained by tracking pointers to newly generated clusters. These pointers can later be used to regenerate instance to cluster pointers in one pass over the newly generated clusters. Since at each action, newly generated clusters can contain duplicates, we can apply the duplicate cluster pruning process in each iteration. The full process can be repeated until all clusters are refined.

At 924, the top level clusters can be merged. Pattern-based clustering techniques can result in a large number of initial clusters, making the first-level nodes in the cluster hierarchy very sparse. Certain techniques merge first level nodes using agglomerative clustering to reduce sparseness of this level. For example, considering those high computational costs, we can replace agglomerative clustering with bisecting k-means (such as by using I2 criterion function). Unlike certain techniques, first-level clusters in the initial hierarchy need not be based on size-1 patterns.

FIG. 10 is a pseudo-code listing illustrating an example of a function to construct a hierarchy using clusters. The function illustrated in FIG. 10 can correspond with method 900, in an example. Additionally, FIG. 11 is a pseudo-code listing illustrating an example of functions to add a pattern to a cluster, prune duplicate clusters, and refine clusters. The functions illustrated can correspond to blocks 914, 920, and 922, respectively, in an example.

Example of Data Clustering Using Patterns

Figure 12:
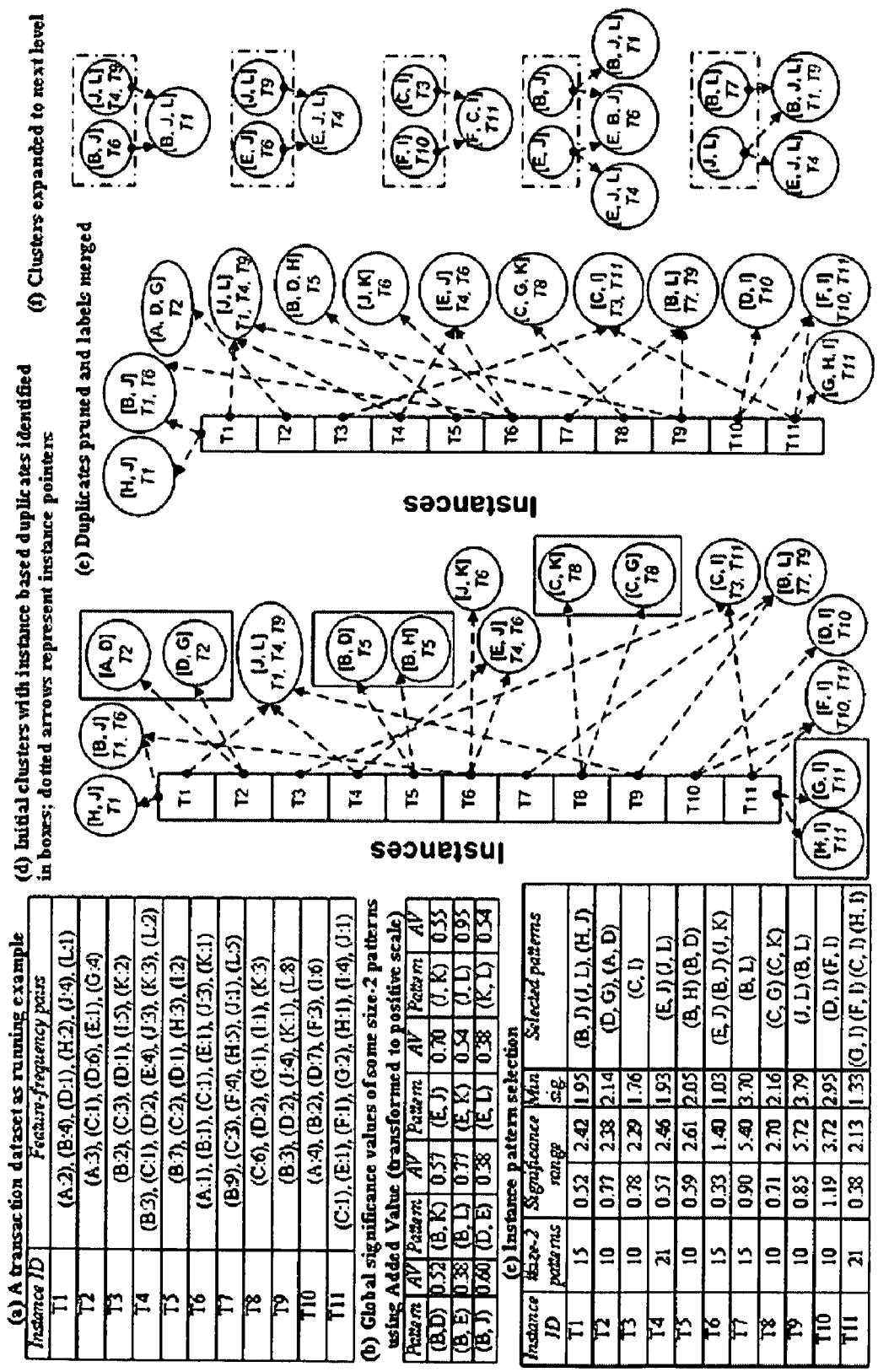
FIG. 12 illustrates an example of various stages in a pattern-based clustering process.

FIG. 12 illustrates an example of various stages in a pattern-based clustering process. FIG. 12(*a*) provides an example transaction dataset. Using "Added Value" as the interestingness measure, and min_std_dev=1.0, the most significant patterns with respect to each instance can be obtained, such as shown in FIG. 12(*c*). These patterns can be used to form the initial clusters in FIG. 12(*d*), which also shows instance to cluster pointers. Note that for demonstration purposes, the example illustrated in FIG. 12 uses a small value for min_std_dev, which results in a higher number of initial patterns.

FIG. 12(*c*) also demonstrates how the technique can "balance" local and global pattern significance. As an example, instance "T4" contains one atomic pattern (e.g., 'E') with local frequency=4, three atomic patterns (e.g., 'B', 'J' and 'K') with frequency=3, two atomic patterns (e.g., 'D' and 'L') with frequency=2, and one atomic pattern (e.g. 'C') with frequency=1. In contrast, a pattern selection scheme that only considers local significance would rank size-2 patterns that include two of {'E', 'B', 'J' and 'K'} higher than the other size-2 patterns in this instance. Similarly, considering the global significance values in FIG. 12(*b*), a pattern selection scheme that only considers global significance would rank patterns ('J', 'L') and ('B', 'L') higher than the other patterns. The final set of patterns selected for this instance (e.g., ('E', 'J') and ('J', 'L')) does include the most frequent local atomic pattern (e.g., 'E'), but does not include two of the three atomic patterns with frequency=3. Instead, the technique can select pattern ('J', 'L') that has a higher global Added Value as shown in FIG. 12(*b*)), providing a better "balance" between local and global significance.

Finally, as illustrated, the number of patterns selected by our standard deviation based scheme is not necessarily proportional to the number of available size-2 patterns. As an example, both T4 and T11 contain 21 size-2 patterns but the technique selected twice as many patterns for T11.

Considering the 17 initial clusters in FIG. 12(*d*), a particular way of identifying duplicate clusters will need up to 136 cluster-pair comparisons. Using instance-to-cluster relationships reduces the number of these comparisons to up to 18 (e.g., only three cluster pair comparisons for T1 can be performed; {('H', 'J'), ('B', 'J')}, {('H', 'J'), ('J', 'L')} and {('B', 'J'), ('J', 'L')}). After processing all instances, we can identify four duplicates (marked in boxes in FIG. 12(*d*)). These duplicates can be pruned and their labels are merged to obtain the 13 clusters in FIG. 12(*e*).

A child cluster with the "merged" label may already exist, for two possible reasons. First, the same cluster pair can have existed in the pointer list of another instance that has already been processed. Second, merging labels of two different cluster pairs can result in a single label. As an example, merging labels of cluster pairs {('B', 'J'), ('J', 'L')} and {('J', 'L'), ('B', 'L')} in FIG. 12(*f*) results in a single label (e.g., ('B', 'L')). However, it can be shown that in all cases, that first appending shared instances to the cluster with the resulting label, and then adding this cluster as a child to both the originating clusters does not impact instance memberships of the originating clusters. One final note: any cluster can share instances with several clusters. These shared instances can be marked for elimination as they are found and can be pruned after processing all instances.

FIG. 12(*f*) demonstrates refining clusters in FIG. 12(*e*) to the next level. Processing cluster pointers from T1, only one pair of non-atomic clusters exists (e.g., {('B', 'J'), ('J', 'L')}), with T1 itself as the only shared instance. The labels of the cluster pair can be merged to obtain ('B', 'J', 'L'), which can be used to form the new child node. Cluster pointers from T2 to T11 can be processed in a similar fashion to obtain 4 clusters for the next level. Note that this process can result in adding several children to the same cluster (e.g., two child clusters added to ('E', 'J')) or appending several instances to an existing child cluster (e.g., two instances added to cluster ('B', 'J', 'L')).

Recap of Data Clustering Techniques Using Patterns

On the surface, it might seem like this approach merely replaces some global thresholds (e.g., minimum support or minimum interestingness, and maximum instance duplication) with a set of local thresholds (e.g., maxK and min_std_dev). However, this approach offers at least three major advantages over certain other global threshold based approaches.

First, selecting a dataset-independent value for any of the commonly used global thresholds (e.g., minimum support) is non-trivial. Any selected value can result in a very large or a very small number of patterns, with no upper bound on the number of patterns mined. In contrast, our main threshold min_std_dev can be supported by statistical principles.

Second, certain approaches rely on a global itemset mining technique, which only considers Boolean presence or absence of items in instances. These approaches therefore ignore local pattern frequencies. On the other hand, the current approach can naturally use these local values while selecting initial patterns, and need not use a threshold for this purpose.

Third, by including the most significant pattern for each instance, the current approach assures that the resulting hierarchy covers all instances.

Overview of Frequency Query Techniques

Calculating itemset support (or frequency counting) is a fundamental operation that directly impacts space and time requirements of data mining processes. Some data mining processes are primarily concerned with identifying the support of a given query itemset, whereas other processes additionally identify the transactions that contain the query itemset. When primarily concerned with identifying the support of an itemset, some data mining techniques use various Trie and bitmap-based representations to improve support (e.g., frequency) counting performance. When the transactions that contain the query itemset are sought to be maintained, additional modifications to Trie structures or the use of bitmaps can be implemented.

Data mining processes can use a Trie data structure to improve the itemset support counting performance. Such approaches, however, do not address the potentially significant problem of overwhelming space requirements, which can be exponential. Some modifications can be made to a Trie structure in an attempt to make it more space efficient, such as using an FP Tree or limiting the branching factor to two.

Figure 13:
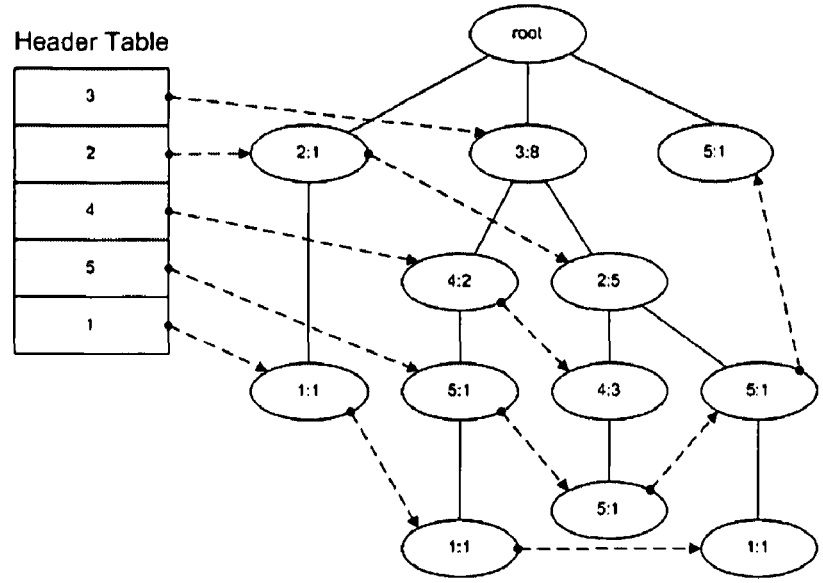
FIG. 13 is an example of an FP Tree.

An FP Tree is a Trie-inspired data structure that reduces the space requirements of the original Trie data structure by eliminating the need to insert each transaction into all paths corresponding to the subsets of the transaction. The FP Tree can be generated by identifying frequent 1-items in one pass over the dataset. These items can be sorted in descending order of their supports and inserted into the FList. A second pass can be made to construct the FP Tree in which items are considered in the order of the FList. The first node corresponding to each item is pointed from a header table and each FP Tree node contains a link to the next node corresponding to the same item. An example of an FP Tree is illustrated in FIG. 13.

Figure 14:
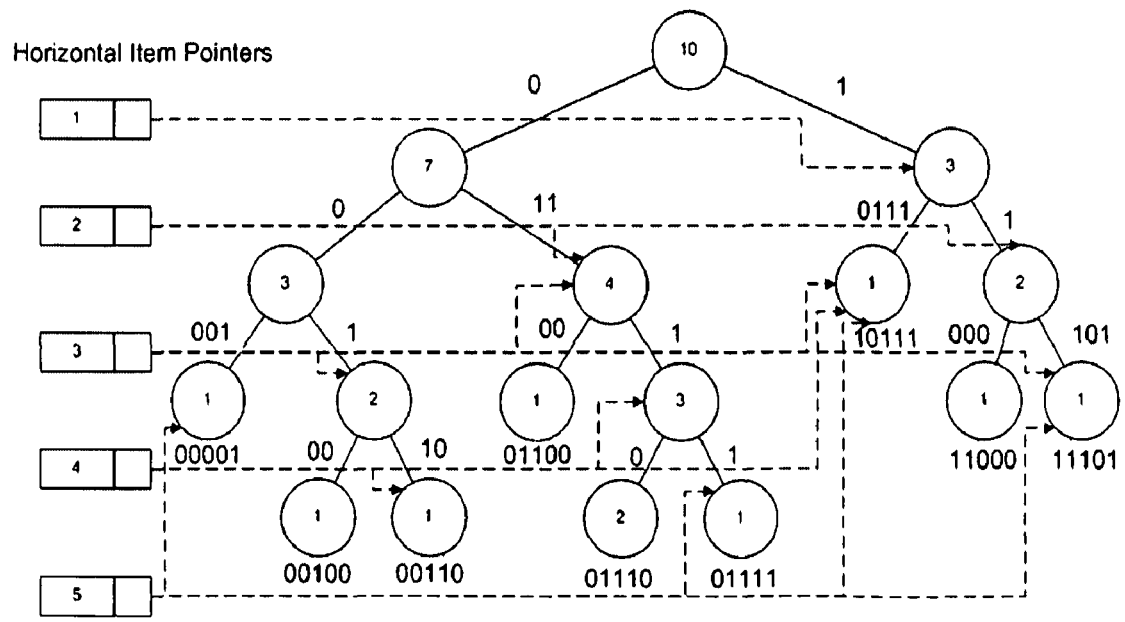
FIG. 14 is an example of a Compressed Patricia Trie.

Another approach includes limiting the branching factor to two. This can be achieved by generating a Binary Trie which considers presence or absence of all items in the transaction, rather than only considering items that exist in the transaction. For each item, a global list of horizontal pointers containing pointers to all nodes that represent the item can be maintained. This list enables efficient support counting. Note that the Binary Trie can contain a large number of single-child nodes, especially on sparse datasets. This observation can be used to merge these degree-1 nodes with their children, while maintaining the corresponding horizontal pointer lists. The resulting data structure is called a Compressed Patricia Trie. An example of a Compressed Patricia Trie is illustrated in FIG. 14.

Trie-based representations can be suitable for processes that are not concerned with the actual transactions that contain the query itemset, but they fall short when these transactions must also be identified. One solution, when using a hierarchical clustering process, can be to store a list containing the applicable transaction IDs at each node of the Trie. This approach can work for small datasets, but is impractical for large datasets because of its significant space requirements. In the worst case (e.g., where each transaction contains each item), IDs of all transactions can be replicated at each node. Another possible, but very inefficient solution, is to first find the support count using the Trie-based data structure and then scan the dataset once to find the applicable transactions.

Considering these issues, a number approaches can be used to adapt uncompressed bitmap-based representations (e.g., vertical bit vectors). A bitmap can be generated for each item in the dataset, where each bit represents the presence or absence of the item in a transaction. In some examples, the number of bitmaps can be reduced by eliminating non-frequent 1-itemsets as a preprocessing step. Support can be calculated by ANDing (e.g., intersecting) bitmaps of all items in the itemset, and counting the number of one-bits in the resulting bitmap. Note that in typical data mining processes (e.g., itemset mining), the number of bitmaps ANDed to find support of an itemset of size k (where k>=2) is exactly two, as the previous step would have already generated and preserved bitmaps of all large k−1 sized subsets of the query itemset (e.g., guaranteed by the downward closure property). Unlike Trie-based approaches, no additional processing is needed to find the transactions containing the query itemset, as these transactions are readily available in the resulting bitmap. An example of a vertical bitmap is illustrated in Table 5 below.

The most significant disadvantage of this approach is that for a dataset containing n transactions and m frequent 1-items, the amount of space needed for these bitmaps is always m×n bits, regardless of the characteristics of the underlying dataset. In reality, many data mining datasets are sparse, which would result in bitmaps with a lot more zero-bits than one-bits. This problem can be addressed by first generating a prefix graph that contains a node for each item, and then storing a separate set of variable-sized horizontal bitmaps along with each node. This approach facilitates fast support counting, and frequent itemset mining but does not automatically identify corresponding transactions.

When vertical bit vectors are used, the itemset support counting problem is a specialization (e.g., subset) of the problem of processing bitmap indices to find all rows from a database table, that satisfy the given criteria. Column values in a database table can be both equality and range coded, and the criteria can contain a variety of logical operations (e.g., the "where" clause in SQL, ignoring joins and other cross-table operations). In the case of support counting, the values can be equality coded (e.g., presence or absence of an item in a transaction) and the problem can be reduced to finding all rows that contain all items in the given criteria (e.g., the query itemset). Considering this observation, the present inventors have recognized that techniques to optimize the performance of bitwise logical operations on equality coded index bitmaps in the very large databases (VLDB) domain can be applied on the vertical bit vectors used for itemset support calculation.

In an example, to gain space and time efficiencies, a compressed bitmap representation can be used. Word-Aligned Hybrid code (WAH) is a linear-time compression scheme that reads a bit sequence one bit at a time, and produces a word aligned compressed bitmap, where the word size W is configurable. Each word in the resulting compressed bitmap represents either a literal run or a fill run. Literal runs contain uncompressed data while the fill runs contain a word-aligned sequence (e.g., fill) of consecutive zero or one bits. The first bit in each word identifies the run type (e.g., 0=literal run, and 1=fill run). In case of a literal run, the rest of the W−1 bits in the word contain a direct sequence of bits, whereas in the case of a fill run, the second bit in the word identifies the fill bit b, and the remaining W−2 bits contain a count c which represents a sequence of c*(W−1), b-bits. Note that for an input bitmap with n bits, the size of WAH compressed bitmap is upper bounded by:

$$\lceil \frac{n}{W-1} \rceil \times W$$

bits, or O(n). The worst case occurs when there are no fill runs in the resulting WAH compressed bitmap. Furthermore, the absolute value for the worst case (and the overhead) decreases as W increases.

Although WAH encoding is described here, it is understood that other encoding schemes can be used. In general, there exists a tradeoff between the degree of compression, and the amount of time needed to perform logical operations on compressed bitmaps. Many lossless compression schemes such as LZ coding, B-W text compression and Huffman coding are effective in compressing bit sequences, but require decompressing operand bitmaps to perform logical operations. Thus, even though these schemes can achieve a higher compression ratio, the computational cost of performing logical operations can make them impractical for query intensive and real-time applications. Considering these issues, we look to a number of schemes that mix run-length encoding and direct storage. These schemes allow logical operations directly on two compressed bitmaps, resulting in a compressed bitmap. Some of these schemes like BBC, PackBits and PBM are byte-based, while other schemes like HRL, WAH, PWC and WBC are word-based. It can be shown that word-based schemes like WAH offer the best space-time tradeoff for performing logical operations.

Similar to vertical bit vectors, support of a query itemset can be obtained by ANDing the corresponding WAH compressed bitmaps, and counting one-bits in the resulting bitmap. Two WAH compressed bitmaps can be ANDed by iteratively decoding words from each of the operand bitmaps, and applying the AND operation on the decoded words. The outcome can then be added to the output bitmap. If both operand words represent literal runs, the outcome can be determined by simply ANDing the two words. If one of the operand words represents a zero-fill, the same number of zeros can be added to the output, and an equal number of bits can be skipped from the other operand bitmap. Finally, if one of the operand bitmaps represents a one-fill, a number of bits equal to the fill size can be added from the other bitmap. Since processing fill runs can result in left over bits from either operand word, some bookkeeping can be used to track these leftover bits. Also, when adding a fill run to the output bitmap, the previous word in the output bitmap can be checked for the presence of a matching fill, and the existing fill count can be incremented by the new fill count, in case of a match.

Note that support has an interesting property that the support of an itemset of size k is less than or equal to the support of all of its k−1 size subset-itemsets. In practice, a large number of itemsets have supports that are less than their subset-itemsets. This results in an important side effect of smaller and smaller WAH compressed bitmaps as the itemset size increases. Consequently, this effect makes WAH compressed vertical bit vectors even more feasible (e.g., space efficient) for processes that store interim results.

The amount of compression achieved by run-length-based compression schemes such as WAH encoding can depend heavily on the availability of long sequences of 0 or 1 bits in the input bitmap. The best compression can be achieved when the transactions are organized in a way that reduces or minimizes the total number of bit shifts. Unfortunately, reorganizing transactions to achieve such an optimal ordering in general is similar to the consecutive block minimization problem (CBMP) which is NP-complete. Even a fairly restricted version of this problem which limits the number of 1's in each row to 2, called 2CBMP, can be proven NP-hard.

In an example, the reordering can be performed using a Hamming-Distance Ordering (HDO) scheme. Other schemes can be used, such as Gray code sorting or Least Significant Bit (LSB) Radix sort. A linear in time and space transaction reordering scheme can be based on Gray code ranks, and the reordered bitmaps can achieve better WAH compression. As an alternate, simple linear-time Least Significant Bit (LSB) Radix sort, with one bin for zero-bits and one bin for one-bits, can be used which results in a lexicographic ordering of transactions.

HDO is a greedy process that reorders transactions in a way that ensures a high degree of similarity between neighboring transactions (e.g., minimizes Hamming-distance), hoping that this greedy choice results in a near-optimal solution. In other words, for each position i, HDO finds a transaction t that is closest to the transaction at position i−1. If there is more than one such candidate, it selects the transaction that results in least impact on the number of existing fill runs.

Methods of Frequency Queries

In an example, to calculate the set of least-distant transactions $CL_t$, let S be a set of transactions and t be a transaction in S. Let S' be a subset of S that does not include t. To obtain the set of transactions $CL_t$ that are closest (e.g., least-distant) to t, for each transaction x in S', calculate tDist(t, x) and store the outcome in list L. Additionally, the minimum Distance value MIN is tracked. Then, for each transaction x in S, add x to $CL_t$ if and only if tDist(t, x)=MIN.

The inter-transaction distance can be calculated as follows: Let $t_i$ be a transaction at position i and $t_j$ be a transaction at position j, distance between $t_i$ and $t_j$ is defined as:

$$tDist(t_i,t_j)=countOneBits(bitmap_{t_i} XOR\ bitmap_{t_j})$$

The function countOneBits(bitmap) returns the number of 1-bits in bitmap. The smaller is the value of tDist between $t_i$ and $t_j$, the closer $t_i$ and $t_j$ are to each other. Thus, if tDist=0, bitmaps for $t_i$ and $t_j$ are exactly the same.

Figure 15:
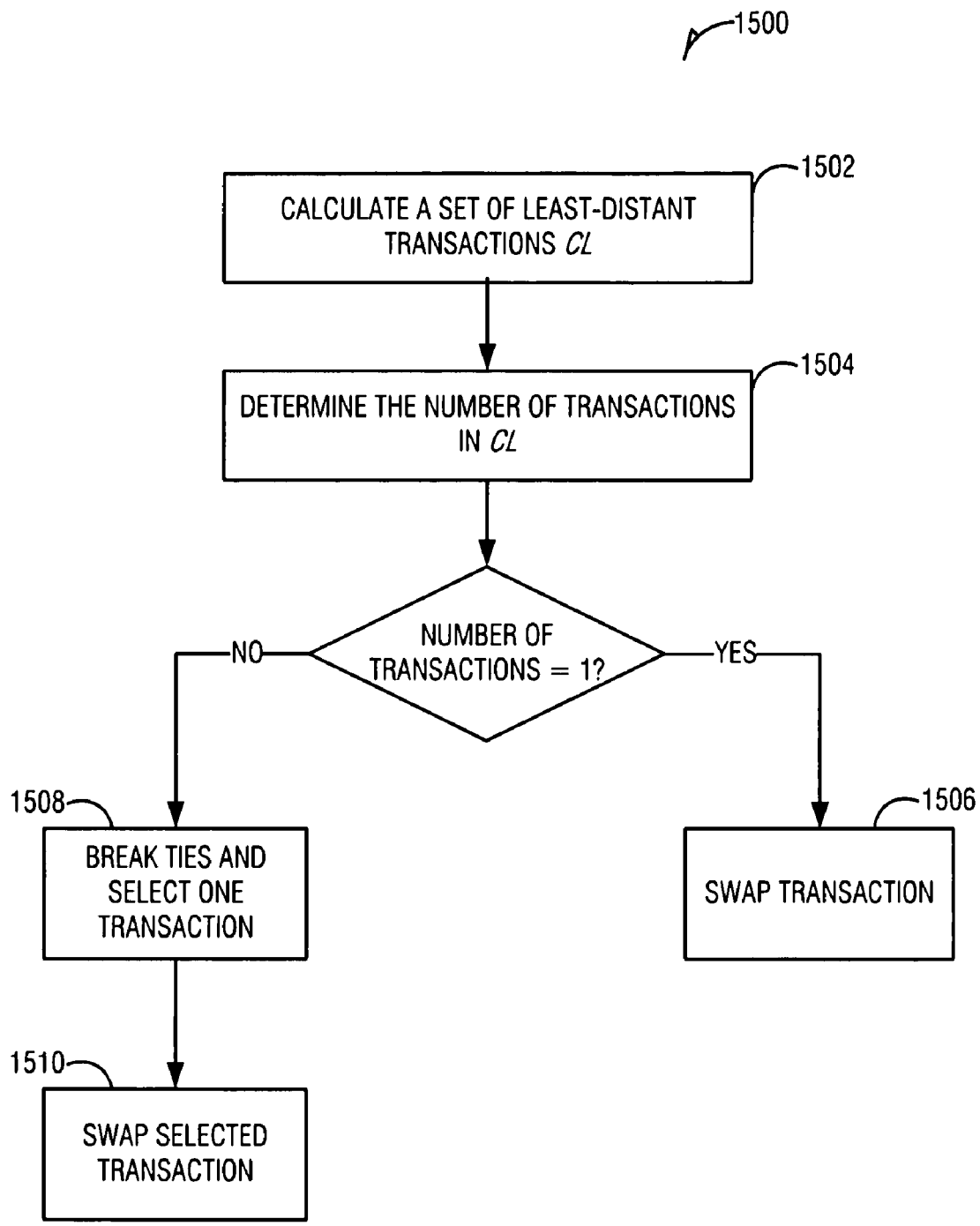
FIG. 15 is an example of ordering transactions to reduce the number of bit shifts.

FIG. 15 is an example of ordering transactions to reduce the number of bit shifts. For the purposes of this discussion, let S be a set of transactions. Assume that transactions $S_1$ to $S_{i-1}$ are already ordered, such as by using HDO. If S'={S}−$\{S_1 \ldots _{i-1}\}$, the next transaction $S_i$ is ordered by method 1500.

At 1502, the set of least-distant transactions can be calculated. To calculate the set of least-distant transactions with respect to the next transaction $S_i$, we can set t=$S_{i-1}$ and S', and obtain the set of least-distant transactions $CL_t$ using the method above.

At 1504, the number of transactions in $CL_t$ can be determined. At 1506, if the number of transactions in $CL_t$ is one, then the unique transaction can be swapped with the transaction at $S_i$. At 1508, if the number of transactions in $CL_t$ is more than one, then the transactions in $CL_t$ can be further processed to "break the ties" and determine a selected transaction. Then, at 1510, the selected transaction can be swapped with the transaction at $S_i$.

In an example, if $|CL_t|>1$ (e.g., there is more than one least-distant transaction to t), the ties can be broken such as by selecting the candidate that minimizes the bit changes among the three transactions (e.g., the transaction t, the transaction prior to t, and the candidate itself). In other words, we can select the candidate with maximum overlap in difference bits against transaction t and its prior transaction, as these bits are part of literal runs started in t. Selecting other bits can break existing fill runs and impact the overall compressibility of the transaction dataset. FIG. 16 is a pseudo-code listing illustrating an example of a function to break ties among several least-distant transactions.

Because of its high worst-case computational cost, HDO might not be suitable for very large, frequently-updated transaction datasets. As such, an approximation to HDO called aHDO can be used, where aHDO has a time complexity linear to the number of bits in the dataset. The approximation to HDO (aHDO) achieves results close to HDO, especially on sparse datasets. FIG. 17 is a pseudo-code listing illustrating an example of aHDO.

Figure 18:
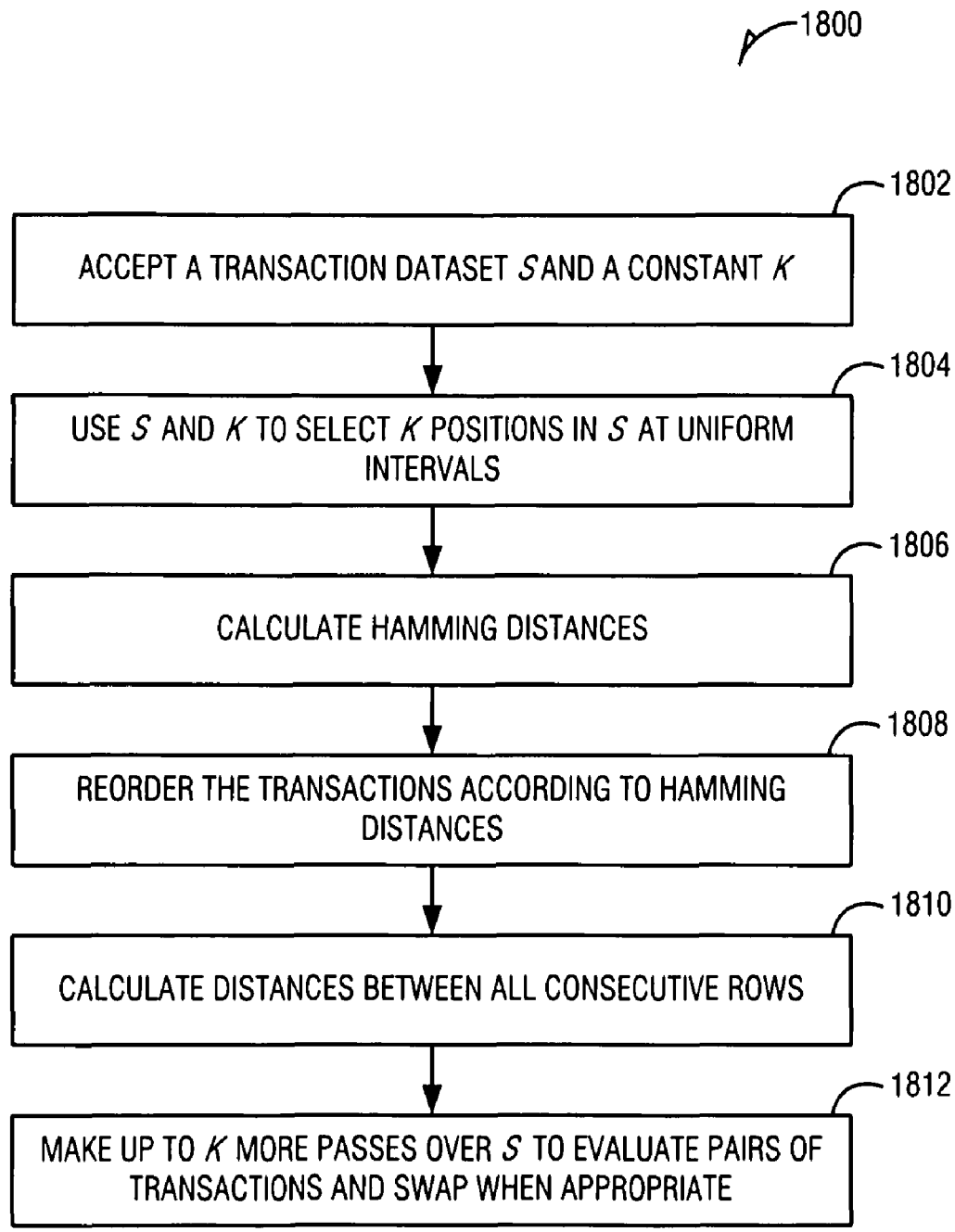
FIG. 18 is an example of ordering transactions such as to reduce the number of bit shifts according to aHDO.

FIG. 18 is an example of ordering transactions such as to reduce the number of bit shifts according to aHDO. At 1802, the method 1800 can accept a transaction dataset S and a constant k. At 1804, the transaction dataset S and the constant k can be used to select k positions in S at uniform intervals. At 1806, Hamming-distances of transactions at positions i+1 to |S| can be calculated against each of the selected transaction $t_i$. At 1808, Counting Sort can then be applied such as to reorder these transactions, according to their Hamming-distances against $t_i$. Note that the linear-time Counting Sort is applicable in this case because the worst case range of Hamming-distances, for a dataset with c columns is already known (e.g., 0...c). Next, at 1810, distances between all consecutive rows can be calculated. At 1812, another (up to) k passes is made over S. In each pass, pairs of consecutive transactions can be evaluated, and transactions in the pair can be swapped if it reduces the overall number of bit shifts in the solution.

Considering four rows at positions j−1, j, j+1 and j+2, distances between consecutive row pairs (j−1,j), (j,j+1) and (j+1,j+2) are already available. Rows at positions j and j+1 are swapped only if tDist(j−1, j) is greater than tDist(j−1, j+1) or tDist(j+1,j+2) is greater than tDist(j, j+2), and neither of them results in a difference greater than the current order of the four transactions. This means that swapping a row pair results in reducing the total number of bit changes by at-least 1. Note that reducing the total number of bit changes does not mean that the overall size of the compressed transaction dataset will also reduce (e.g., it can replace a long, existing fill run with two small fill runs), as providing such a guarantee would require checking a number of additional conditions, against all other bits and transactions in worst case, resulting in an exponential-time process. Setting k in the range of 50 to 2,000, e.g., a small proportion to the number of transactions, worked well on datasets used in our experiments.

Example of an Implementation of HDO

Table 4 illustrates a transaction database having ten transactions (T1...T10) in the first column, items associated with each transaction in the second column, frequent items in order of decreasing support in the third column, and bitmaps representing each transaction in the fourth column.

TABLE 4

| TID | Items | Frequent items ordered w.r.t. decreasing supports | Bitmaps representing each transaction |
|---|---|---|---|
| T1 | {1, 2} | {2, 1} | 11000 |
| T2 | {1, 3, 4, 5} | {3, 4, 5, 1} | 10111 |
| T3 | {2, 3, 4} | {3, 2, 4} | 01110 |
| T4 | {2, 3, 4, 5} | {3, 2, 4, 5} | 01111 |
| T5 | {2, 3, 4} | {3, 2, 4} | 01110 |

TABLE 4-continued

| TID | Items | Frequent items ordered w.r.t. decreasing supports | Bitmaps representing each transaction |
|---|---|---|---|
| T6 | {1, 2, 3, 5} | {3, 2, 5, 1} | 11101 |
| T7 | {2, 3} | {3, 2} | 01100 |
| T8 | {3, 4} | {3, 4} | 00110 |
| T9 | {5} | {5} | 00001 |
| T10 | {3} | {3} | 00100 |

Table 5 illustrates vertical bit vectors for the dataset in Table 4.

TABLE 5

| Item | Vertical bit vector | WAH compressed bitmap |
|---|---|---|
| 1 | 1100010000 | 0110 0001 1001 0000 |
| 2 | 1011111000 | 0101 1101 0100 0000 |
| 3 | 0111111101 | 0011 1101 0110 0100 |
| 4 | 0111100100 | 0011 0110 0010 0000 |
| 5 | 0101010010 | 0010 0101 0001 0000 |

Table 6 illustrates the transaction dataset in the original order (column 1), an optimal order (column 2), a Gray code sorted order (column 3), and a Radix sorted order (column 4).

TABLE 6

| | Original order | Optimal order | Gray code sorted | Radix sorted |
|---|---|---|---|---|
| | T1: 101 | T3: 001 | T3: 001 | T3: 001 |
| | T2: 110 | T1: 101 | T2: 110 | T4: 100 |
| | T3: 001 | T4: 100 | T1: 101 | T1: 101 |
| | T4: 100 | T2: 110 | T4: 100 | T2: 110 |
| Bit changes in each column | 3, 3, 4 | 2, 2, 2 | 2, 3, 4 | 2, 2, 4 |
| Total bit changes | 10 | 6 | 9 | 8 |

The original order of the rows causes three bit shifts in the first column, three bit shifts in the second column and four bit shifts in the third column, adding to a total of 10 bit shifts. In contrast, the transaction ordering in the second column uses only two bit shifts in each column, adding to a total of six bit shifts for the transaction dataset, which represents a 40% reduction.

To apply HDO on a transaction dataset with n transactions, we can first swap the first transaction in the dataset with a transaction with a minimum number of columns, and then iteratively call HDO on transactions 2 to n−1, such as by using the method above. As an example, Table 7 demonstrates applying HDO on the dataset in Table 6. We can see that the final reordered bitmap achieves a total bit count of 6, which is same as the optimal ordering in this case. Note that our HDO process is an in-place process and works linear in terms of space. However, it has a time complexity of $O(|rows|^2 \times |cols|)$, which is worse than both Gray code rank-based and Radix sort-based reordering schemes. Each of these schemes has a time complexity linear to the number of bits in the dataset (e.g., $O(|rows| \times |cols|)$).

TABLE 7

Step 1: Find a transaction t with minimum number of 1-bits

1: T1: 101
2: T2: 110

TABLE 7-continued

3: T3: 001
4: T4: 100
Step 2: Swap row 1 with t (e.g., row 3)

1: T3: 001
2: T2: 110
3: T1: 101
4: T4: 100
Step 3: Calculate difference bitmaps and
counts for rows 2 to 4, against row 1

1: 001
2: 110 = 111 = 3
3: 101 = 100 = 1
4: 100 = 101 = 2
Step 4: Swap rows 2 and 3

1: T3: 001
2: T1: 101
3: T2: 110
4: T4: 100
Step 5: Calculate difference bitmaps and
counts for rows 3 & 4

1: 001
2: 101
3: 110 = 011 = 2
4: 100 = 001 = 1
Step 6: Swap rows 3 and 4

1: T3: 001
2: T1: 101
3: T4: 100
4: T2: 110

Recap of Frequency Query Techniques

Looking at Trie and bitmap-based structures, it can be seen that Trie structures are viable for applications that mostly execute long, random queries, as long as there is no concern with identifying the actual transactions. To overcome this, HDO, a Hamming-distance-based greedy transaction reordering scheme is described. HDO results in better compression and outperforms other structures on short database style frequency queries. In addition, approximate HDO, aHDO, can serve as a practical alternate to HDO on sparse datasets. Although uncompressed bitmaps can be a good choice for data mining applications that are not concerned with high space requirements, HDO-WAH encoded bitmaps provide the best space-time tradeoff.

Example System for Data Mining

Figure 19:
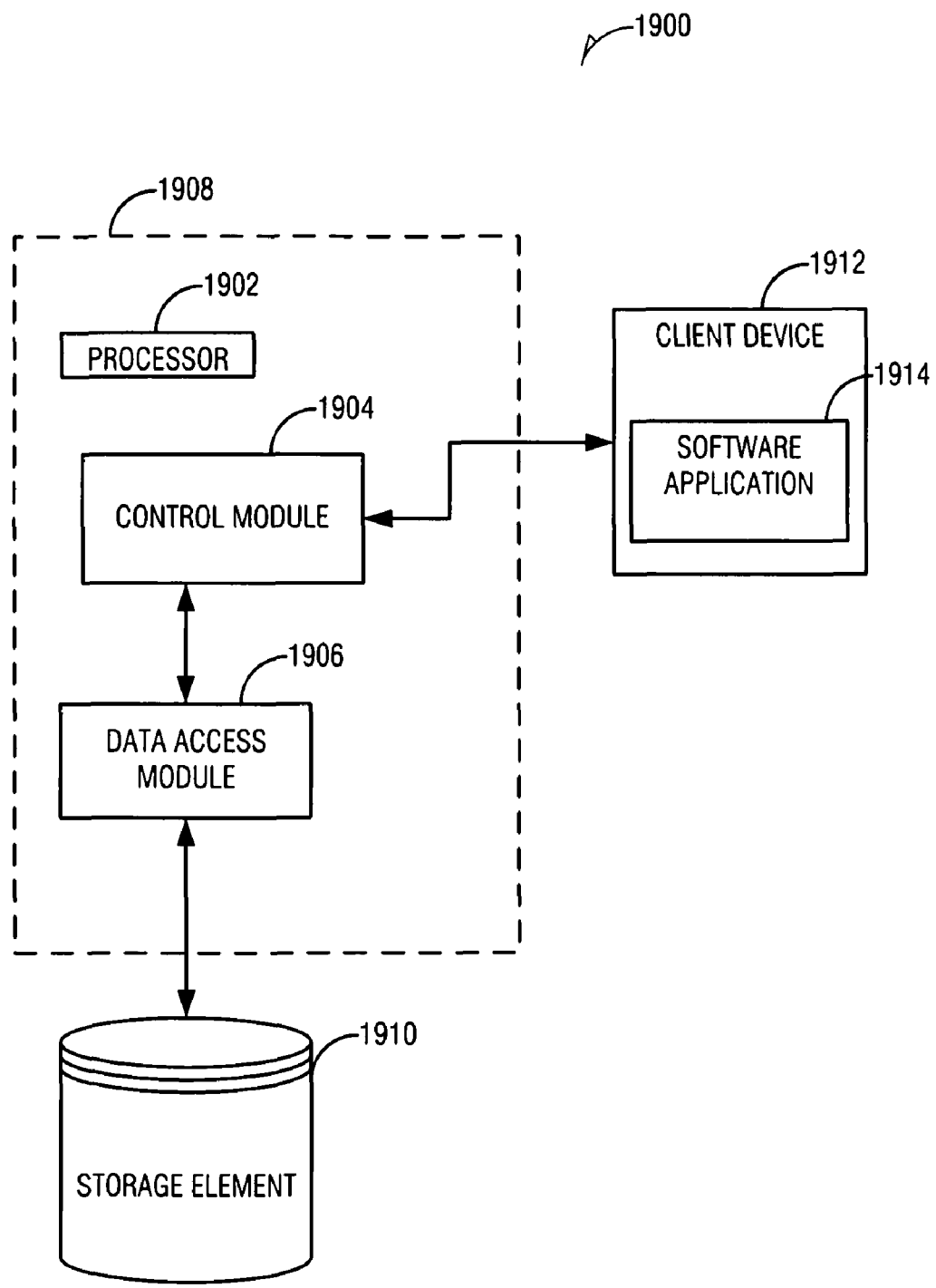
FIG. 19 is an example of a system used to provide data classification and clustering.

FIG. 19 is an example of a system 1900 used to provide data classification and clustering. The system 1900 can include a number of modules such as one or more processors 1902, a control module 1904, and a data access module 1906. These modules 1902, 1904, 1906 can be associated within a machine 1908, as indicated by their containment within the dashed box. The modules 1902, 1904, 1906 shown to be located within the confines of the machine 1908 can also be located outside the machine 1908, and appropriately coupled to the machine 1908 such as via one or more wired or wireless connections.

The control module 1904 can be used to manage access requests (e.g., from a client 1916), respond with query results, manage job control flow, or the like. In some embodiments, the control module 1904 can include a web server, a database server, a transaction server, a business rules system, a customer relation management system, or combinations thereof.

In general, the control module 1904 allows users to access the system 1900, initiate and control data management tasks, and request or display output information. The control module 1904 can include additional sub-modules to perform specific tasks. For example, the control module 1904 can include a communication module to communicate with external devices, a presentation module to render data for viewing, or various modules that are designed to perform mathematical, computational, organizational, or other functions.

The data access module 1906 can be used by the control module 1904 to access a storage element 1910. The storage element 1910 can include memory devices such as a database, a memory, a disk, or other storage device.

The storage element 1910 can serve to store datasets, intermediate results, queries, data output, and the like. The data access module 906 can operate to read from and/or write to the storage element 1910 and can provide reading and writing services for the benefit of other system modules, including the control module 1904 and the processor 1902. In some embodiments, the storage element 1910 can include databases, such as relational databases, flat files, XML based databases, object databases, or, in some cases, Online Analytic Processing (OLAP) based databases.

In the case of relational databases, various tables of data can be created and data can be inserted into and/or selected from these tables using SQL or some other database-query language known in the art. In the case of OLAP databases, one or more multi-dimensional cubes or hyper cubes, including multidimensional data from which data is selected from or inserted into using a Multidimensional Expression (MDX) language, can be implemented. In the case of a database using tables and SQL, a database application (e.g., database products) such as, for example, MYSQL™, MICROSOFT SQL SERVER™, ORACLE 8I™, 10G™, or some other suitable database application can be used to manage the data.

The data access module 1906 can be present in some embodiments, and absent in others. When present, the data access module 1906 can operate as a mediator between the various modules of the system 1900.

The control module 1904 can be operably coupled to a client device 1912. The client device 1912 can comprise devices, such as a computer, a display screen, a handheld portable device, a kiosk, or other client devices used to present or display data. The client device 1912 can also comprise a software application 1914 to interface with the control module 1904 and perform, in whole or in part, the methods and functions described herein.

Hardware Platform

Figure 20:
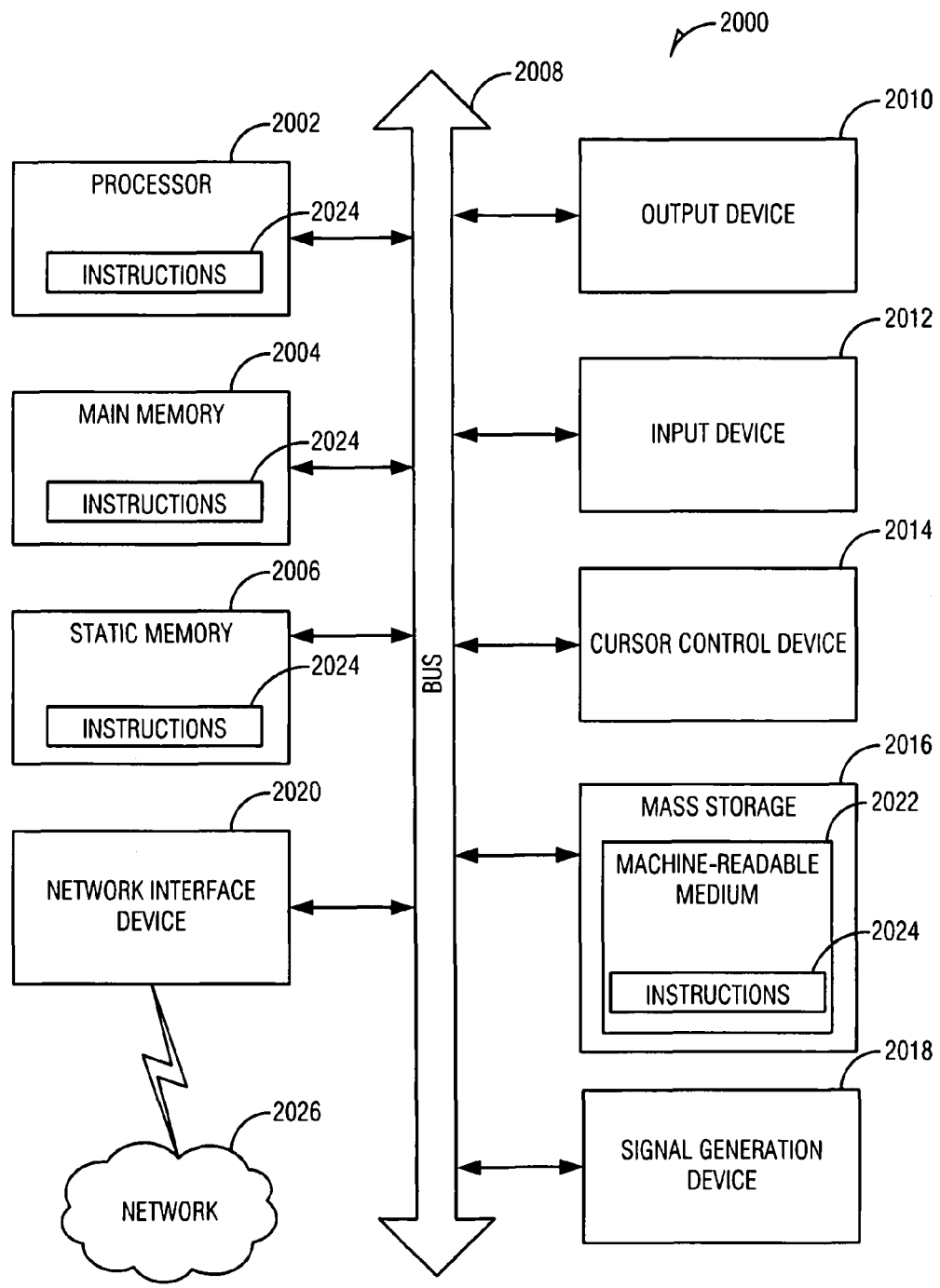
FIG. 20 is an example machine.

FIG. 20 is an example machine 2000. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language such as Java or C++. Alternatively, the programs can be structured in a procedure-orientated format using a procedural language, such as assembly or C. The software components can communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments can be realized. For example, an article of manufacture, such as a computer, a memory system, a magnetic or optical disk, some other storage device, and/or any type of electronic device or system can include one or more processors 2002 coupled to a machine-readable medium 2022 such as a memory (e.g., removable storage media, as well as any memory including an electrical, optical, or electromagnetic conductor) having instructions 2024 stored thereon (e.g., computer program instructions), which when executed by the one or more processors 2002 result in performing any of the actions described with respect to the methods above.

The machine 2000 can take the form of a computer system having a processor 2002 coupled to a number of components directly, and/or using a bus 2008. Such components can include main memory 2004, static or non-volatile memory 2006, and mass storage 2016. Other components coupled to the processor 2002 can include an output device 2010, such as a video display, an input device 2012, such as a keyboard, and a cursor control device 2014, such as a mouse. A network interface device 2020 to couple the processor 2002 and other components to a network 2026 can also be coupled to the bus 2008. The instructions 2024 can further be transmitted or received over the network 2026 via the network interface device 2020 utilizing any one of a number of well-known transfer protocols (e.g., HTTP). Any of these elements coupled to the bus 2008 can be absent, present singly, or present in plural numbers, depending on the specific embodiment to be realized.

The processor 2002, the memories 2004, 2006, and the storage device 2016 can each include instructions 2024 which, when executed, cause the machine 2000 to perform any one or more of the methods described herein. In alternative embodiments, the machine 2000 operates as a standalone device or can be connected (e.g., networked) to other machines. In a networked environment, the machine 2000 can operate in the capacity of a server or a client machine in server-client network environment, or as a peer machine in a peer-to-peer (or distributed) network environment. The machine 2000 can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 2000 is illustrated, the term "machine" shall also be taken to include any collection of machines that individually or jointly execute a set (or multiple sets) of instructions to perform any one or more of the methodologies discussed herein.

While the machine-readable medium 2024 is shown as a single medium, the term "machine-readable medium" should be taken to include a single medium or multiple media (e.g., a centralized or distributed database, and/or associated caches and servers, and or a variety of storage media, such as the processor 2002 registers, memories 2004, 2006, and the storage device 2016) that store the one or more sets of instructions 2024. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to tangible media, such as solid-state memories, optical, and magnetic media.

CONCLUSION

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Implementing the apparatus, systems, and methods of the various embodiments can provide the ability to configure a user interface for an online community. Although embodiments of the invention have been described with reference to specific example embodiments, it will be evident that various modifications and changes can be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those of ordinary skill in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
using a computer comprising a processor to perform:
initializing a model, the model including a plurality of classes;
selecting subsets of patterns from a set of available patterns in a training instance selected from a training set of training instances, the selecting subsets including selecting a subset of size-1 patterns and selecting a subset of size-2 patterns;
initializing a weight of each size-1 pattern in the subset of size-1 patterns;
including each size-1 pattern in the subset of size-1 patterns in each class in the plurality of classes in the model;
calculating an overall significance value of each size-2 pattern in the training instance;
sorting the size-2 patterns using the overall significance;
selecting the highest k sorted size-2 patterns;
initializing a weight of each selected highest k size-2 pattern;
adjusting the weights on the size-1 and size-2 patterns; and
presenting the model organized with the plurality of classes, each class including the size-1 patterns, the highest k size-2 patterns, and the weights of the size-1 and size-2 patterns.

2. The computer-implemented method of claim 1, comprising:
calculating a local, class, and global significance value for each size-2 pattern in the training instance, wherein at least the local and global significance values are calculated using different methods; and
using the local, class, and global values to calculate the overall significance.

3. The computer-implemented method of claim 2, wherein the local significance value is calculated by calculating a central tendency of the term frequency values of a first size-1 pattern and a second size-1 pattern that compose the size-2 pattern, the term frequency indicating how frequently a size-1 pattern occurs in a particular training instance.

4. The computer-implemented method of claim 2, wherein the global significance value is calculated by applying an interestingness measure to the size-2 pattern with respect to the training instance.

5. The computer-implemented method of claim 4, wherein the interestingness measure is selected from the group consisting of: Added Value, Mutual Information, Chi-Square, and Yule's Q.

6. The computer-implemented method of claim 1, wherein selecting the subset of size-1 patterns comprises:
determining a number n of size-1 patterns to use for classification;
including the top n globally significant size-1 patterns from the training set in the selected subset of size-1 patterns; and
adding size-1 patterns that are locally significant to each training instance in the training set to the selected subset of size-1 patterns.

7. The computer-implemented method of claim 6, wherein the number n is calculated using number of training instances and a total number of available size-1 patterns.

8. The computer-implemented method of claim 7, wherein the number n is calculated using the equation:

$$n = i + \left(i \times \log\frac{f}{i}\right),$$

where i = number of training instances and f = total number of available size-1 patterns.

9. The computer-implemented method of claim 2, wherein selecting globally significant features comprises:
selecting size-1 patterns having a frequency in the training set between a specified lower bound and a specified upper bound;
sorting the selected size-1 patterns according to their Information Gain values; and
selecting the resulting top-n size-1 patterns as being globally significant size-1 patterns.

10. The computer-implemented method of claim 1, wherein adjusting the weights on the size-1 and size-2 patterns comprises using z-score normalization.

11. The computer-implemented method of claim 1, comprising:
creating an uncompressed bitmap representation of each training instance in, each bitmap representation including a plurality of n ordered bits, each bit indicating whether a corresponding item selected from a set of n items is present in the corresponding instance;
reordering the bitmap representations of the instances into an order that reduces or minimizes Hamming-distances; and
compressing the reordered bitmap representations.

12. A system comprising:
a memory; and
a control module coupled to the memory, the control module comprising:
  a first initialization module to initialize a model, the model including a plurality of classes;
  a first selection module to select subsets of patterns from a set of available patterns in a training instance selected from a training set of training instances, the selecting subsets including selecting a subset of size-1 patterns and selecting a subset of size-2 patterns;
  a second initialization module to initialize a weight of each size-1 pattern in the subset of size-1 patterns;
  an organization module to include each size-1 pattern in the subset of size-1 patterns in each class in the plurality of classes in the model;
  a first calculation module to calculate an overall significance value of each size-2 pattern in the training instance;
  a sorting module to sort the size-2 patterns using the overall significance;
  a second selection module to select the highest k sorted size-2 patterns;
  a third initialization module to initialize a weight of each selected highest k size-2 pattern;
  an adjustment module to adjust the weights on the size-1 and size-2 patterns; and
  a presentation module to present the model organized with the plurality of classes, each class including the size-1 patterns, the highest k size-2 patterns, and the weights of the size-1 and size-2 patterns.

13. The system of claim 12, comprising:
  a second calculation module to calculat a local, class, and global significance value for each size-2 pattern in the training instance, wherein at least the local and global significance values are calculated using different methods; and
  a second organization module to use the local, class, and global values to calculate the overall significance.

14. The system of claim 13, wherein the local significance value is calculated by calculating a central tendency of the term frequency values of a first size-1 pattern and a second size-1 pattern that compose the size-2 pattern, the term frequency indicating how frequently a size-1 pattern occurs in a particular training instance.

15. A non-transitory machine-readable medium including instructions, which when executed by a machine, cause the machine to perform operations comprising:
  initializing a model, the model including a plurality of classes;
  selecting subsets of patterns from a set of available patterns in a training instance selected from a training set of training instances, the selecting subsets including selecting a subset of size-1 patterns and selecting a subset of size-2 patterns;
  initializing a weight of each size-1 pattern in the subset of size-1 patterns;
  including each size-1 pattern in the subset of size-1 patterns in each class in the plurality of classes in the model;
  calculating an overall significance value of each size-2 pattern in the training instance;
  sorting the size-2 patterns using the overall significance;
  selecting the highest k sorted size-2 patterns;
  initializing a weight of each selected highest k size-2 pattern;
  adjusting the weights on the size-1 and size-2 patterns; and
  presenting the model organized with the plurality of classes, each class including the size-1 patterns, the highest k size-2 patterns, and the weights of the size-1 and size-2 patterns.

16. A computer-implemented method comprising:
using a computer comprising a processor to perform:
  receiving a dataset comprising a plurality of instances, each instance including a plurality of size-2 patterns;
  for each instance in the dataset:
    computing an overall significance value of each size-2 pattern in the instance;
    sorting the plurality of size-2 patterns in the instance based on the overall significance value;
    selecting the top-k size-2 patterns, the k value being specified; and
    including the top-k size-2 patterns in a cluster in a set of clusters; and
  presenting the set of clusters of top-k size-2 patterns.

17. The computer-implemented method of claim 16, comprising:
  calculating a local and global significance value for each size-2 pattern in the instance, wherein at least the local and global significance values are calculated using different methods; and
  using the local and global values to calculate the overall significance.

18. The computer-implemented method of claim 16, comprising:
  reducing the dimensionality of the dataset before processing the instances, the reducing the dimensionality performed to provide a reduced dataset.

19. The computer-implemented method of claim 18, wherein reducing the dimensionality comprises:
  selecting size-1 patterns having a frequency in the dataset that is between a specified lower bound and a specified upper bound;
  sorting the selected size-1 patterns according to the frequency of the pattern in the dataset; and
  including the top-t sorted size-1 patterns in the reduced dataset, wherein t is a specified value.

20. The computer-implemented method of claim 16, wherein selecting the top-k size-2 patterns comprises:
  determining whether a size-2 pattern has a significance value above a minimum acceptable significance value; and
  including the size-2 pattern in the selected top-k size-2 patterns when the significance value is above the minimum acceptable significance value.

21. The computer-implemented method of claim 20, wherein the minimum acceptable significance value is calculated as a function of a measure of centrality and a measure of dispersion of the overall significance values.

22. The computer-implemented method of claim 16, comprising pruning duplicate clusters after all instances in the dataset have been processed.

23. The computer-implemented method of claim 16, comprising refining the set of clusters, wherein refining the set of clusters comprises:
  identifying cluster pairs from non-atomic clusters that share at least one instance; and
  merging the shared instances into a child cluster in the set of clusters.

24. The computer-implemented method of claim 16, wherein selecting the top-k size-2 patterns comprises allowing each instance to "vote" for a specified number of representative size-2 patterns.

25. The computer-implemented method of claim 16, wherein selecting the top-k size-2 patterns is performed without using a global threshold that applies across the entire dataset.

26. The computer-implemented method of claim 16, comprising:
creating an uncompressed bitmap representation of each instance in the dataset, each bitmap representation including a plurality of n ordered bits, each bit indicating whether a corresponding item selected from a set of n items is present in the corresponding instance;
reordering the bitmap representations of the instances into an order that reduces or minimizes at least approximate Hamming-distances; and
compressing the reordered bitmap representations.

27. A system comprising:
a memory; and
a control module coupled to the memory, the control module comprising:
a receiving module to receive a dataset comprising a plurality of instances, each instance including a plurality of size-2 patterns;
a looping module to loop for each instance in the dataset:
a computation module to compute an overall significance value of each size-2 pattern in the instance;
a sorting module to sort the plurality of size-2 patterns in the instance based on the overall significance value;
a selection module to select the top-k size-2 patterns, the k value being specified; and
an organization module to include the top-k size-2 patterns in a cluster in a set of clusters; and
a presentation module to present the set of clusters of top-k size-2 patterns.

28. The system of claim 27, wherein the selection module is further configured to:
determine whether a size-2 pattern has a significance value above a minimum acceptable significance value; and
include the size-2 pattern in the selected top-k size-2 patterns when the significance value is above the minimum acceptable significance value.

29. The system of claim 28, wherein the minimum acceptable significance value is calculated as a function of a measure of centrality and a measure of dispersion of the overall significance values.

30. A non-transitory machine-readable medium including instructions, which when executed by a machine, cause the machine to perform operations comprising:
receiving a dataset comprising a plurality of instances, each instance including a plurality of size-2 patterns;
for each instance in the dataset:
computing an overall significance value of each size-2 pattern in the instance;
sorting the plurality of size-2 patterns in the instance based on the overall significance value;
selecting the top-k size-2 patterns, the k value being specified; and
including the top-k size-2 patterns in a cluster in a set of clusters; and
presenting the set of clusters of top-k size-2 patterns.

* * * * *

UNITED STATES PATENT AND TRADEMARK OFFICE
CERTIFICATE OF CORRECTION

PATENT NO. : 8,407,164 B2  
APPLICATION NO. : 12/602908  
DATED : March 26, 2013  
INVENTOR(S) : Malik et al.

Page 1 of 1

It is certified that error appears in the above-identified patent and that said Letters Patent is hereby corrected as shown below:

On the Title page, Item 56, in column 2, under "Other Publications", line 3, delete "Univeristy" and insert --University--, therefor In the Claims In column 32, line 12, in claim 3, delete "1pattern" and insert --1 pattern--, therefor In column 32, line 43, in claim 8, delete "i =number" and insert --i = number--, therefor In column 32, line 43, in claim 8, delete "f=total" and insert --f = total--, therefor In column 33, line 34, in claim 13, delete "calculat" and insert --calculate--, therefor Signed and Sealed this  
Eighteenth Day of June, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,407,164 B2  Page 1 of 1
APPLICATION NO. : 12/602908
DATED : March 26, 2013
INVENTOR(S) : Malik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

First Day of September, 2015

Michelle K. Lee
*Director of the United States Patent and Trademark Office*